(12) United States Patent
Richardson

(10) Patent No.: US 12,011,956 B2
(45) Date of Patent: Jun. 18, 2024

(54) INFLATION SYSTEM

(71) Applicant: Aperia Technologies, Inc., Burlingame, CA (US)

(72) Inventor: Brandon Richardson, Burlingame, CA (US)

(73) Assignee: Aperia Technologies, Inc., Hayward, CA (US)

( * ) Notice: Subject to any disclaimer, the term of this patent is extended or adjusted under 35 U.S.C. 154(b) by 187 days.

(21) Appl. No.: 17/085,010

(22) Filed: Oct. 30, 2020

(65) Prior Publication Data

US 2021/0046787 A1    Feb. 18, 2021

Related U.S. Application Data

(63) Continuation of application No. 16/404,341, filed on May 6, 2019, now Pat. No. 10,850,576, which is a continuation of application No. 16/184,848, filed on Nov. 8, 2018, now Pat. No. 10,406,869.

(60) Provisional application No. 62/584,584, filed on Nov. 10, 2017.

(51) Int. Cl.
| | |
|---|---|
| *B60C 23/12* | (2006.01) |
| *B60C 23/00* | (2006.01) |
| *F24F 3/14* | (2006.01) |
| *F24F 3/153* | (2006.01) |

(52) U.S. Cl.
CPC .......... *B60C 23/127* (2020.05); *B60C 23/004* (2013.01); *F24F 3/1411* (2013.01); *F24F 3/153* (2013.01); *B60C 23/126* (2020.05); *B60C 23/129* (2020.05); *F24F 2003/1452* (2013.01)

(58) Field of Classification Search
CPC ... B60C 23/126; B60C 23/127; B60C 23/129; B60C 23/004; B60C 23/003; F24F 3/1411; F24F 3/153; F24F 2003/1452
See application file for complete search history.

(56) References Cited

U.S. PATENT DOCUMENTS

| | | |
|---|---|---|
| 1,358,524 A | 11/1920 | Cooper |
| 1,448,248 A | 3/1923 | Anthony |
| 2,089,297 A | 8/1937 | Read et al. |
| 2,202,665 A | 5/1940 | Metz |
| 2,211,935 A | 8/1940 | Parker |
| 2,415,618 A * | 2/1947 | West ................ F04B 39/0005 92/182 |
| 2,440,255 A | 4/1948 | Forrest |
| 2,496,691 A | 2/1950 | Berry |
| 2,899,907 A | 8/1959 | Becher |
| 2,962,119 A | 11/1960 | White |

(Continued)

FOREIGN PATENT DOCUMENTS

| | | |
|---|---|---|
| BR | 102012023751 A2 | 8/2014 |
| BR | 112015017312 A2 | 7/2017 |

(Continued)

OTHER PUBLICATIONS

International Search Report and Written Opinion for PCT Application No. PCT/US2014/23499 dated Aug. 18, 2014.

(Continued)

*Primary Examiner* — Kip T Kotter
(74) *Attorney, Agent, or Firm* — Jeffrey Schox; Diana Lin

(57) ABSTRACT

The inflation system includes a pump and a dehumidifier fluidly connected between the pump and a reservoir, such as a tire.

20 Claims, 10 Drawing Sheets

(56) References Cited

U.S. PATENT DOCUMENTS

| | | |
|---|---|---|
| 3,012,820 A | 12/1961 | King |
| 3,047,339 A | 7/1962 | Hamer |
| 3,152,553 A | 10/1964 | Sverker |
| 3,175,507 A | 3/1965 | Sverker |
| 3,249,059 A | 5/1966 | Renn |
| 3,400,074 A | 9/1968 | Grenci |
| 3,452,801 A | 7/1969 | Fletcher et al. |
| 3,511,294 A | 5/1970 | Bepristis et al. |
| 3,532,449 A | 10/1970 | Garton |
| 3,730,215 A | 5/1973 | Conery et al. |
| 3,886,974 A | 6/1975 | Bjorklund |
| 3,981,633 A | 9/1976 | Wall |
| 4,018,579 A | 4/1977 | Hofmann |
| 4,030,300 A | 6/1977 | Thompson |
| 4,042,446 A | 8/1977 | Lawton |
| 4,095,923 A | 6/1978 | Cullis |
| 4,121,472 A | 10/1978 | Vural et al. |
| 4,157,530 A | 6/1979 | Merz |
| 4,180,985 A | 1/1980 | Northrup |
| 4,256,971 A | 3/1981 | Griffith |
| 4,291,235 A | 9/1981 | Bergey et al. |
| 4,370,894 A | 2/1983 | Sturesson |
| 4,460,006 A | 7/1984 | Kolze |
| 4,536,668 A | 8/1985 | Boyer |
| 4,606,710 A | 8/1986 | Maguire |
| 4,637,152 A | 1/1987 | Roy |
| 4,651,792 A | 3/1987 | Taylor |
| 4,744,399 A | 5/1988 | Magnuson et al. |
| 4,768,542 A | 9/1988 | Morris |
| 4,807,487 A | 2/1989 | Seidl |
| 4,819,593 A | 4/1989 | Bruener et al. |
| 4,852,528 A | 8/1989 | Richeson et al. |
| 4,893,459 A | 1/1990 | Orlando |
| 4,895,199 A | 1/1990 | Magnuson et al. |
| 4,910,148 A | 3/1990 | Sorensen et al. |
| 4,922,984 A | 5/1990 | Dosjoub et al. |
| 5,018,797 A | 5/1991 | Takata |
| 5,052,456 A | 10/1991 | Dosjoub |
| 5,173,038 A | 12/1992 | Hopfensperger et al. |
| 5,201,968 A | 4/1993 | Renier |
| 5,293,919 A | 3/1994 | Olney et al. |
| 5,325,902 A | 7/1994 | Loewe et al. |
| 5,342,177 A | 8/1994 | Cheng |
| 5,370,711 A | 12/1994 | Audit et al. |
| 5,375,984 A | 12/1994 | Wehling |
| 5,388,470 A | 2/1995 | Marsh |
| 5,409,049 A | 4/1995 | Renier |
| 5,413,159 A | 5/1995 | Olney et al. |
| 5,429,927 A | 7/1995 | Afseth et al. |
| 5,468,129 A | 11/1995 | Sunden et al. |
| 5,482,447 A | 1/1996 | Sunden et al. |
| 5,495,879 A | 3/1996 | Cabestrero |
| 5,512,439 A | 4/1996 | Hornes et al. |
| 5,525,493 A | 6/1996 | Hornes et al. |
| 5,538,062 A | 7/1996 | Stech |
| 5,591,281 A | 1/1997 | Loewe |
| 5,646,727 A | 7/1997 | Hammer et al. |
| 5,667,606 A | 9/1997 | Renier |
| 5,707,215 A | 1/1998 | Olney et al. |
| 5,759,820 A | 6/1998 | Hornes et al. |
| 5,894,757 A | 4/1999 | Sully |
| 5,941,692 A | 8/1999 | Olney et al. |
| 5,941,696 A | 8/1999 | Fenstermacher et al. |
| 5,947,696 A | 9/1999 | Baumgarten |
| 6,092,545 A | 7/2000 | Bedore et al. |
| 6,144,295 A | 11/2000 | Adams et al. |
| 6,267,450 B1 | 7/2001 | Gamble |
| 6,360,768 B1 | 3/2002 | Galler |
| 6,463,798 B2 | 10/2002 | Niekerk et al. |
| 6,474,832 B2 | 11/2002 | Murray |
| 6,482,592 B1 | 11/2002 | Lundeberg et al. |
| 6,494,693 B1 | 12/2002 | Sunden |
| 6,663,348 B2 | 12/2003 | Schwarz et al. |
| 6,742,386 B1 | 6/2004 | Larson |
| 6,744,356 B2 | 6/2004 | Hamilton et al. |
| 6,787,233 B1 | 9/2004 | Molteberg et al. |
| 6,814,547 B2 | 11/2004 | Childers et al. |
| 6,871,683 B2 | 3/2005 | Cobb |
| 6,984,702 B2 | 1/2006 | Fonnum et al. |
| 6,986,913 B2 | 1/2006 | Fonnum et al. |
| 6,994,136 B2 | 2/2006 | Stanczak |
| 7,013,931 B2 | 3/2006 | Toit |
| 7,029,576 B2 | 4/2006 | Siegfriedsen |
| 7,117,731 B2 | 10/2006 | Hrabal |
| 7,160,707 B2 | 1/2007 | Fonnum et al. |
| 7,173,124 B2 | 2/2007 | Deggerdal et al. |
| 7,217,762 B1 | 5/2007 | Joergedal et al. |
| 7,222,487 B1 | 5/2007 | Hinkley |
| 7,225,845 B2 | 6/2007 | Ellmann |
| 7,237,590 B2 | 7/2007 | Loewe |
| 7,255,323 B1 | 8/2007 | Kadhim |
| 7,302,837 B2 | 12/2007 | Wendte |
| 7,322,392 B2 | 1/2008 | Hawes |
| 7,357,164 B2 | 4/2008 | Loewe |
| 7,498,683 B2 | 3/2009 | Landwehr |
| 7,506,663 B2 | 3/2009 | Thomas et al. |
| 7,581,576 B2 | 9/2009 | Nakano |
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,763,689 B2 | 7/2010 | Fonnum et al. |
| 7,784,487 B2 | 8/2010 | Arnett |
| 7,784,513 B2 | 8/2010 | Loewe |
| 7,810,582 B2 | 10/2010 | Webb |
| 7,828,095 B2 | 11/2010 | Murata et al. |
| 7,828,101 B2 | 11/2010 | Radtke et al. |
| 7,847,421 B2 | 12/2010 | Gardner et al. |
| 7,856,871 B2 | 12/2010 | Mancosu et al. |
| 7,927,170 B2 | 4/2011 | Bickerton et al. |
| 7,931,061 B2 | 4/2011 | Gonska et al. |
| 7,931,817 B2 | 4/2011 | Bilski |
| 7,975,789 B2 | 7/2011 | Murata |
| 7,985,340 B2 | 7/2011 | Almaasbak et al. |
| 7,989,614 B2 | 8/2011 | Deggerdal et al. |
| 7,989,975 B2 | 8/2011 | Clement et al. |
| 8,004,104 B2 | 8/2011 | Hench |
| 8,022,561 B2 | 9/2011 | Ciglenec et al. |
| 8,038,987 B2 | 10/2011 | Fonnum et al. |
| 8,042,586 B2 | 10/2011 | Losey et al. |
| 8,083,503 B2 | 12/2011 | Voltenburg et al. |
| 8,110,351 B2 | 2/2012 | Bosnes |
| 8,113,254 B2 | 2/2012 | Benedict |
| 8,186,402 B2 | 5/2012 | Eigenbrode |
| 8,534,335 B2 | 9/2013 | Benedict |
| 8,581,433 B2 | 11/2013 | Sidenmark |
| 8,646,426 B2 | 2/2014 | Finkenbiner |
| 8,747,084 B2 | 6/2014 | Richardson et al. |
| 8,794,280 B2 | 8/2014 | Flory et al. |
| 8,801,910 B2 | 8/2014 | Bazant et al. |
| 9,039,386 B2 | 5/2015 | Richardson et al. |
| 9,039,392 B2 | 5/2015 | Richardson et al. |
| 9,074,595 B2 | 7/2015 | Richardson |
| 9,145,887 B2 | 9/2015 | Richardson |
| 9,151,288 B2 | 10/2015 | Richardson et al. |
| 9,381,780 B2 | 7/2016 | Hinque |
| 9,428,016 B2 | 8/2016 | Keeney et al. |
| 9,434,218 B2 | 9/2016 | Root |
| 9,597,932 B2 | 3/2017 | Dieckmann et al. |
| 9,604,157 B2 | 3/2017 | Richardson |
| 9,682,599 B1 | 6/2017 | Hinque et al. |
| 9,789,739 B1 | 10/2017 | Hennig |
| 10,052,834 B2 | 8/2018 | Losey |
| 10,137,745 B2 | 11/2018 | McClellan |
| 10,166,821 B2 | 1/2019 | Hennig |
| 10,183,535 B2 | 1/2019 | Chemali |
| 10,189,320 B2 | 1/2019 | Hinque |
| 10,239,364 B2 | 3/2019 | Hennig |
| 10,358,005 B2 | 7/2019 | McClellan |
| 10,406,869 B2 | 9/2019 | Richardson |
| 10,422,660 B2 | 9/2019 | Creech et al. |
| 10,513,156 B2 | 12/2019 | Hrabal |
| 10,576,794 B2 | 3/2020 | Lee |

(56) References Cited

U.S. PATENT DOCUMENTS

| | | | |
|---|---|---|---|
| 10,625,544 B2 | 4/2020 | Balistreri | |
| 10,850,576 B2 * | 12/2020 | Richardson | F24F 3/153 |
| 11,199,186 B2 | 12/2021 | Slesinski et al. | |
| 11,209,289 B2 | 12/2021 | Creech et al. | |
| 11,353,137 B2 | 6/2022 | Scopesi | |
| 11,370,189 B2 | 6/2022 | Tsiberidis | |
| 2001/0000305 A1 | 4/2001 | Murray | |
| 2002/0092346 A1 | 7/2002 | Niekerk et al. | |
| 2003/0021693 A1 | 1/2003 | Schwarz et al. | |
| 2003/0109657 A1 | 6/2003 | Fonnum et al. | |
| 2004/0007302 A1 | 1/2004 | Hamilton et al. | |
| 2004/0050760 A1 | 3/2004 | Siegfriedsen | |
| 2004/0216827 A1 | 11/2004 | Stanczak | |
| 2005/0014001 A1 | 1/2005 | Fonnum et al. | |
| 2005/0067207 A1 | 3/2005 | Radtke et al. | |
| 2005/0126273 A1 | 6/2005 | Hrabal | |
| 2005/0147822 A1 | 7/2005 | Fonnum et al. | |
| 2005/0239068 A1 | 10/2005 | Bosnes | |
| 2006/0055174 A1 | 3/2006 | Landwehr | |
| 2006/0102268 A1 | 5/2006 | Loewe | |
| 2006/0118224 A1 | 6/2006 | Ellmann | |
| 2006/0169349 A1 | 8/2006 | Nakano | |
| 2007/0017595 A1 | 1/2007 | Arno et al. | |
| 2007/0018458 A1 | 1/2007 | Martinez | |
| 2007/0020130 A1 | 1/2007 | Malbec et al. | |
| 2007/0040135 A1 | 2/2007 | Dyer et al. | |
| 2007/0068238 A1 | 3/2007 | Wendte | |
| 2007/0107822 A1 | 5/2007 | Loewe | |
| 2007/0148022 A1 | 6/2007 | Cheng | |
| 2007/0151648 A1 | 7/2007 | Loewe | |
| 2007/0175831 A1 | 8/2007 | Almaasbak et al. | |
| 2008/0017256 A1 | 1/2008 | Thomas et al. | |
| 2008/0035399 A1 | 2/2008 | Murata et al. | |
| 2008/0093814 A1 * | 4/2008 | Filippi | B60C 23/004 |
| | | | 152/418 |
| 2008/0135151 A1 | 6/2008 | Loewe | |
| 2008/0149404 A1 | 6/2008 | Yang | |
| 2008/0156406 A1 * | 7/2008 | Breed | B60C 23/0433 |
| | | | 152/415 |
| 2008/0174120 A1 | 7/2008 | Gardner et al. | |
| 2008/0247883 A1 | 10/2008 | Yokomachi et al. | |
| 2008/0289739 A1 | 11/2008 | Bol | |
| 2008/0300396 A1 | 12/2008 | Deggerdal et al. | |
| 2008/0308330 A1 | 12/2008 | Murata | |
| 2009/0008942 A1 | 1/2009 | Clement et al. | |
| 2009/0032158 A1 | 2/2009 | Rudolf et al. | |
| 2009/0087325 A1 | 4/2009 | Voltenburg et al. | |
| 2009/0126997 A1 | 5/2009 | Webb | |
| 2009/0188310 A1 | 7/2009 | Mancosu et al. | |
| 2009/0206024 A1 | 8/2009 | Bilski | |
| 2009/0256532 A1 | 10/2009 | Ciglenec et al. | |
| 2009/0301575 A1 | 12/2009 | Arnett | |
| 2009/0311941 A1 | 12/2009 | Bickerton et al. | |
| 2010/0102564 A1 | 4/2010 | Hench | |
| 2010/0147429 A1 | 6/2010 | Gonska et al. | |
| 2010/0243121 A1 | 9/2010 | Eigenbrode | |
| 2011/0018275 A1 | 1/2011 | Sidenmark | |
| 2011/0061621 A1 | 3/2011 | Finkenbiner | |
| 2011/0146867 A1 | 6/2011 | Benedict | |
| 2011/0146868 A1 | 6/2011 | Losey et al. | |
| 2011/0308953 A1 | 12/2011 | Bazant et al. | |
| 2012/0020822 A1 | 1/2012 | Richardson et al. | |
| 2012/0073716 A1 | 3/2012 | Benedict | |
| 2013/0068361 A1 | 3/2013 | Flory et al. | |
| 2013/0251552 A1 | 9/2013 | Richardson | |
| 2013/0251553 A1 | 9/2013 | Richardson et al. | |
| 2014/0000755 A1 | 1/2014 | Richardson et al. | |
| 2014/0102621 A1 | 4/2014 | Losey | |
| 2014/0186195 A1 | 7/2014 | Richardson et al. | |
| 2014/0260969 A1 | 9/2014 | Richardson | |
| 2015/0059950 A1 | 3/2015 | Hinque | |
| 2015/0101723 A1 | 4/2015 | Keeney et al. | |
| 2015/0218987 A1 * | 8/2015 | Minato | F01N 3/0807 |
| | | | 251/324 |
| 2015/0239309 A1 | 8/2015 | Root | |
| 2015/0360522 A1 | 12/2015 | Dieckmann et al. | |
| 2015/0367693 A1 | 12/2015 | Richardson et al. | |
| 2016/0167465 A1 | 6/2016 | Hinque | |
| 2017/0015147 A1 | 1/2017 | McClellan | |
| 2017/0015156 A1 | 1/2017 | McClellan | |
| 2017/0036162 A1 | 2/2017 | Hoeldrich | |
| 2017/0166017 A1 | 6/2017 | Hinque | |
| 2017/0166018 A1 | 6/2017 | Hinque et al. | |
| 2017/0299077 A1 | 10/2017 | Jabcon et al. | |
| 2018/0001718 A1 | 1/2018 | Hennig | |
| 2018/0022170 A1 | 1/2018 | Hennig | |
| 2018/0072112 A1 | 3/2018 | Lee | |
| 2018/0170125 A1 | 6/2018 | Woodley | |
| 2018/0178598 A1 | 6/2018 | Woodley | |
| 2018/0207575 A1 | 7/2018 | Dunning et al. | |
| 2018/0231395 A1 | 8/2018 | Creech et al. | |
| 2018/0250991 A1 | 9/2018 | Hrabal | |
| 2018/0326932 A1 | 11/2018 | Chemali | |
| 2019/0023085 A1 | 1/2019 | Chemali | |
| 2019/0063414 A1 | 2/2019 | Slesinski et al. | |
| 2019/0118593 A1 | 4/2019 | Hrabal | |
| 2019/0126693 A1 | 5/2019 | Balistreri | |
| 2019/0271407 A1 | 9/2019 | Scopesi | |
| 2019/0368897 A1 | 12/2019 | Creech et al. | |
| 2020/0070450 A1 | 3/2020 | Tsiberidis | |
| 2020/0130435 A1 | 4/2020 | Root et al. | |
| 2020/0130436 A1 | 4/2020 | Root et al. | |
| 2020/0130437 A1 | 4/2020 | Root et al. | |
| 2020/0134942 A1 | 4/2020 | Root et al. | |
| 2022/0161611 A1 | 5/2022 | Hrabal | |

FOREIGN PATENT DOCUMENTS

| | | |
|---|---|---|
| CA | 2440255 A1 | 3/2005 |
| CN | 2202665 Y | 7/1995 |
| CN | 2496691 Y | 6/2002 |
| CN | 2635411 Y | 8/2004 |
| CN | 101415946 A | 4/2009 |
| CN | 101844491 A | 9/2010 |
| CN | 102963222 A | 3/2013 |
| CN | 103009938 A | 4/2013 |
| CN | 103171160 A | 6/2013 |
| CN | 103770579 A | 5/2014 |
| CN | 103879244 A | 6/2014 |
| CN | 102015334 B | 10/2014 |
| CN | 102963222 B | 5/2015 |
| CN | 102963221 B | 6/2015 |
| CN | 105365504 A | 3/2016 |
| CN | 105365505 A | 3/2016 |
| CN | 103009938 B | 6/2016 |
| CN | 103879243 B | 3/2017 |
| CN | 107816564 A | 3/2018 |
| CN | 108349337 A | 7/2018 |
| CN | 108349338 A | 7/2018 |
| CN | 108349340 A | 7/2018 |
| CN | 109070663 A | 12/2018 |
| CN | 110114231 A | 8/2019 |
| CN | 107816564 B | 11/2019 |
| CN | 108349338 B | 6/2020 |
| CN | 108349337 B | 11/2020 |
| CN | 108349340 B | 3/2021 |
| CN | 109070663 B | 8/2021 |
| DE | 1042446 B | 10/1958 |
| DE | 4042446 A1 | 7/1992 |
| DE | 19739144 A1 | 3/1999 |
| DE | 102012106549 A1 | 5/2014 |
| DE | 202017104222 U1 | 8/2017 |
| DE | 102019121377 A1 | 2/2021 |
| EP | 2572903 A1 | 3/2013 |
| EP | 2572903 B1 | 4/2016 |
| EP | 2951036 B1 | 12/2016 |
| EP | 3296131 A1 | 3/2018 |
| EP | 3332223 A1 | 6/2018 |
| EP | 3442813 A1 | 2/2019 |
| EP | 3296131 B1 | 6/2019 |
| EP | 3332223 B1 | 7/2019 |
| EP | 3535142 A1 | 9/2019 |
| EP | 3442813 B1 | 3/2020 |
| EP | 3535142 B1 | 9/2021 |

(56) References Cited

FOREIGN PATENT DOCUMENTS

| | | | | |
|---|---|---|---|---|
| GB | 530005 | A | 12/1940 | |
| GB | 2089297 | A | 6/1982 | |
| JP | 2005231573 | A | 9/2005 | |
| JP | 2010149073 | A | 7/2010 | |
| JP | 2011203230 | A | 10/2011 | |
| JP | 2014177168 | A * | 9/2014 | ............ B60C 23/12 |
| KR | 20070098639 | A | 10/2007 | |
| KR | 20080039578 | A | 5/2008 | |
| KR | 20140003969 | U | 6/2014 | |
| KR | 20170029520 | A | 3/2017 | |
| KR | 102256754 | B1 | 5/2021 | |
| RU | 112098 | U1 | 1/2012 | |
| WO | 2009034321 | A1 | 3/2009 | |
| WO | 2009110001 | A1 | 9/2009 | |
| WO | 2012012617 | A2 | 1/2012 | |
| WO | 2017064106 | A1 | 4/2017 | |

OTHER PUBLICATIONS

International Search Report and Written Opinion for PCT Application No. PCT/US2017/050254 dated Nov. 16, 2017.
International Search Report and Written Opinion for PCT Application No. PCT/US2019/031695 dated Jun. 26, 2019.
Richardson, Brandon, et al., "System and Method for Tire Inflator Management", U.S. Appl. No. 18/538,645, filed Dec. 13, 2023.

* cited by examiner

INFLATION SYSTEM

CROSS-REFERENCE TO RELATED APPLICATIONS

This application is a continuation of U.S. Pat. No. 10,850,576 issued 1 Dec. 2020, which is a continuation application of U.S. Pat. No. 10,406,869 issued 10 Sep. 2019 which claims the benefit of US Provisional Application No. 62/584,584 filed 10 Nov. 2017, which is incorporated in its entirety by this reference.

This application is related to U.S. application Ser. No. 14/863,119 filed 23 Sep. 2015, which is a continuation of U.S. Pat. No. 9,604,157 issued 28 Mar. 2017, each of which is incorporated in its entirety by this reference.

TECHNICAL FIELD

This invention relates generally to the pumping field, and more specifically to a new and useful inflation system in the pumping field.

BACKGROUND

In many inflation applications, such as tire inflation applications, it is highly desirable to keep water or other liquids from entering the target reservoir (e.g., end container, such as a tire), and to fill the end container with dry working fluid (e.g., air) instead of humid working fluid. This can be particularly desirable in applications where tire life maximization is desired (e.g., such as in tires-as-a-service applications) and/or in applications where the tire is being repeatedly inflated and deflated (e.g., in dynamic tire pressure control applications), because water in the tire lumen can contribute to increased tire degradation and tire imbalance. Thus, there is a need in the pumping field to create a new and useful inflation system with water management.

DESCRIPTION OF THE PREFERRED EMBODIMENTS

1. Overview.

Figure 1:
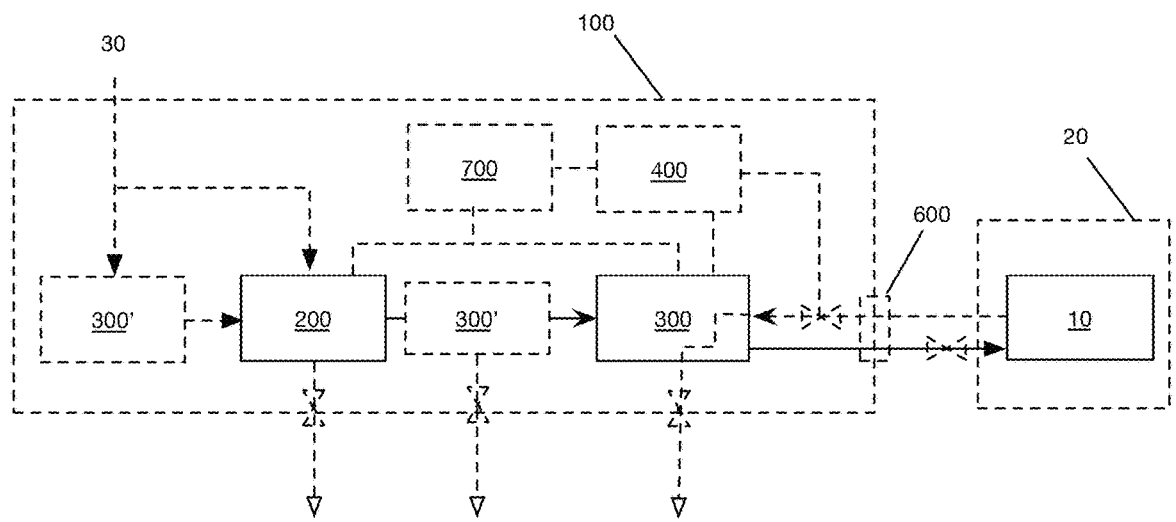
FIG. 1 is a schematic representation of a flow diagram of the inflation system.

As shown in FIG. 1, the inflation system 100 includes a pump 200 and a dehumidifier 300 fluidly connected between the pump 200 and a reservoir 10, such as a tire 11. The inflation system 100 can optionally include a regeneration system 400, a housing 800, a cooling system 500, a reservoir connector 600, a control system 700, one or more manifolds fluidly connecting inflation system components, one or more valves controlling fluid flow between system components and/or the ambient environment, or any other suitable set of components.

The inflation system 100 functions to pump working fluid 30 (e.g., gas, air, nitrogen, etc.) from a fluid source into a reservoir 10. In variants, the inflation system 100 functions to pressurize working fluid 30, dehumidify the pressurized working fluid 32, and inflate the tire 11 with the dehumidified, pressurized working fluid 34. The inflation system 100 can also function to extract moisture and/or particulates from the gas prior to introduction into the reservoir 10, and to dispose of the extracted moisture and/or particulates. The inflation system 100 is preferably a tire inflation system 100, but can additionally or alternatively be any used in any other suitable application.

In a specific example (example shown in FIG. 2), the inflation system 100 is a wheel-mounted tire inflation system, and includes: a pump 200 mounted to (or mountable to) a wheel 21 of a vehicle and fluidly connected to a working fluid source (e.g., the ambient environment) at a pump inlet; a dehumidifier 300 fluidly connected to the pump outlet; and a tire connector fluidly connecting (or configured to fluidly connect) the dehumidifier 300 outlet to the tire 11. The dehumidifier 300 is preferably a desiccant 320 that adsorbs water from the pressurized working fluid 32, but can be any suitable dehumidifier 300. The inflation system 100 can optionally include a regeneration system 400 connected to the dehumidifier 300, wherein the regeneration system 400 can include: a heating system that heats the dehumidifier 300; a purging system 420, such as a regenerating valve selectively connecting the tire interior to the dehumidifier 300; a purge valve selectively fluidly connecting the dehumidifier 300 to the ambient environment; and/or any other suitable regeneration system. The regeneration system 400 can be integrated into the inflation manifold that defines the fluid path for dehumidified, pressurized working fluid supply to the tire, or can include one or more secondary manifolds selectively routing tire air 12 to the dehumidifier 300. The inflation system can optionally include one or more cooling systems 500, such as an expansion chamber (e.g., an isentropic or isobaric expansion chamber), arranged between the pump 200 and the dehumidifier 300, the dehumidifier 300 and the tire 11, the tire 11 and the dehumidifier 300 (e.g., as part of the regeneration system 400), or otherwise arranged. The inflation system 100 can optionally include a control system 700 and a set of sensors (e.g., humidity sensors, pressure sensors, temperature sensors, etc.) that monitor and control inflation system component operation. The inflation system 100 can optionally include one or more preliminary dehumidifiers 300' located upstream of the primary dehumidifier 300 (e.g., such that the inflation system 100 is a multi-stage dehumidification system). The preliminary dehumidifier 300' can be located: upstream of the pump 200 (e.g., at or before the pump inlet), between the pump 200 and the dehumidifier 300, or otherwise located. The inflation system 100 can optionally include a tire purge valve, connected to the tire connector that functions to deflate the tire 11 (e.g., to the ambient environment, to purge the dehumidifier 300, etc.).

Figure 11:
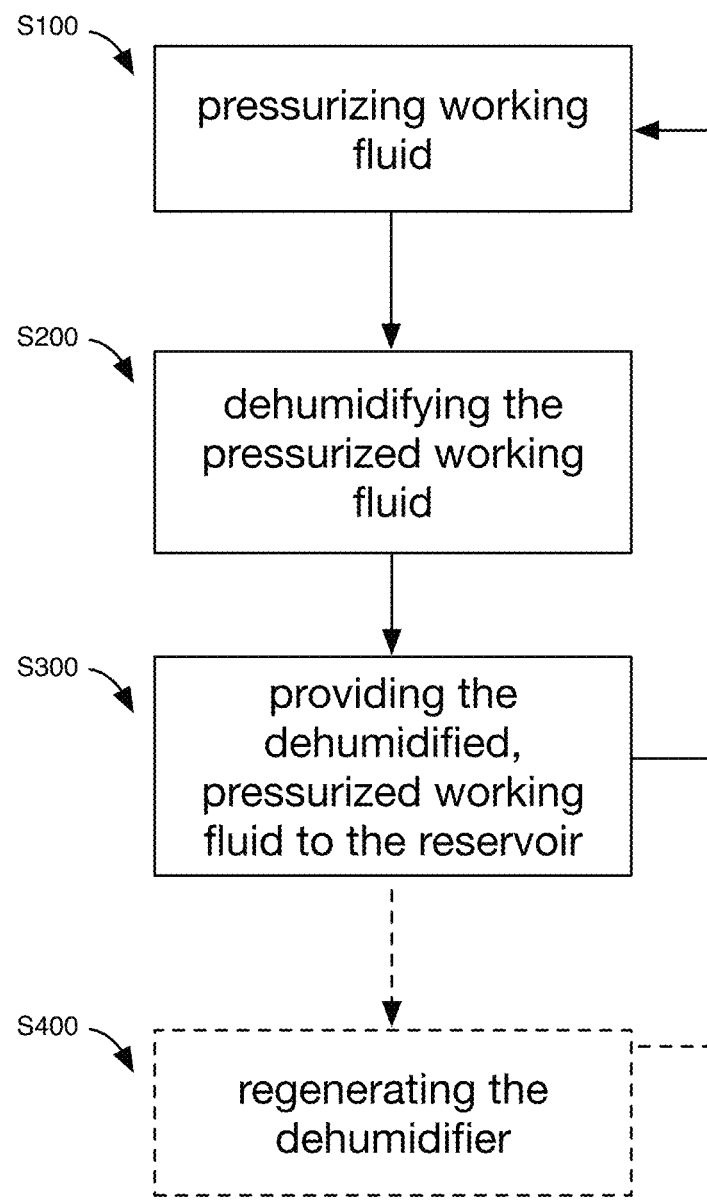
FIG. 11 is a flow diagram of a second variation of the method

In an example of wheel-mounted inflation system operation (examples shown in FIG. 11 and FIG. 12), the method includes: pressurizing a working fluid with the pump, rotating with the wheel, to generate pressurized working fluid S100; dehumidifying the pressurized working fluid with the dehumidifier to generate dehumidified working fluid S200; and providing the dehumidified working fluid to the tire mounted to the wheel S300. The inflation system can optionally: regenerate the dehumidifier (during pump rotation with the wheel) S400 by: heating the dehumidifier, purging the dehumidifier (e.g., with pressurized tire air), or otherwise regenerating the dehumidifier. The inflation system can optionally: cool the working fluid S500 before or after pressurization with the pump; selectively control pump, dehumidifier, and/or regeneration system operation; and/or remove a liquid fraction from the working fluid before, during, or after pressurization with the pump 200 (e.g., resulting a two-stage liquid removal process). In variants, liquid fraction removal can include leveraging the centripetal force (generated by system rotation with the wheel) to collect liquid in a radially-outward collection region within the inflation system, wherein the collected liquid can be purged from the collection region.

2. Benefits.

Variants of the systems and/or methods can confer several benefits and/or advantages over conventional systems.

First, variants of the system can enable air compression at the wheel end of a vehicle system for provision of compressed air to vehicle tires, instead of centralized air compression and distributed delivery of the compressed air. Placing compression at the wheel end can reduce the complexity and extent of pressurized fluid manifolds and/or conduits (e.g., as compared to a centralized fluid compression system).

Second, variants of the system can provide drier working fluid for tire inflation (over conventional wheel-mounted or central tire inflation systems) by shortening the distance between the dehumidifier 300 and the tire interior (e.g., by mounting the dehumidifier 300 on or near the wheel 21).

Variants of the system can also confer this benefit by arranging the dehumidifier 300 within the fluid path connecting the pump 200 and the tire 11. In particular, the inventors have discovered that, in some use cases (e.g., repeated tire inflation/deflation applications), water removal pre-pressurization does not remove a sufficient proportion of the water fraction entrained within the working fluid 30, resulting in water buildup within the tire interior over time.

The inventors have also discovered that, in some use cases (e.g., dynamic tire inflation/deflation applications), condensation or centrifugal water extraction from the pressurized working fluid 32 also does not remove a sufficient proportion of the water fraction entrained within the working fluid. Variants of the system can resolve this issue by leveraging multi-stage water removal. For example, system variants can include at least two stages of water removal: a first stage at the pump 200 (e.g., wherein the pump compression separates the liquid fraction from the gaseous fraction) or after the pump 200 (e.g., using a condensation manifold connected to the pump outlet with nucleation points), and a second stage (e.g., using the dehumidifier 300) downstream from the first stage. Variants of the system can also resolve this issue by using a desiccant 320 as the dehumidifier 300, wherein the pressurized working fluid 32 is passed through the desiccant 320 en route to the tire interior. However, the system can otherwise resolve this issue.

Third, variants of the system can enable long-term performance (e.g., providing pressurized working fluid 32 having less than a predetermined entrained water fraction) by regenerating the dehumidifier 300 on-board the inflation system 100, and/or by having a replaceable dehumidifier 300. For example, the dehumidifier 300 can be regenerated: during inflation system 100 operation, during wheel rotation (e.g., during vehicle operation), after vehicle operation cessation, or at any other suitable time. In some variants, the dehumidifier 300 can be regenerated using air from the tire, which can be drier than the air supplied by the pump 200 because the tire air 12 has been previously dehumidified and expanded within the tire volume. This can confer faster and/or more efficacious dehumidifier regeneration.

Fourth, variants of the system can enable repeated tire inflation and deflation cycles, which can be desirable when dynamically adjusting tire pressure to meet a target tire pressure. The target tire pressure can be determined based on operation conditions, such as road conditions or environment conditions; be determined based on the wheel make or model; determined based on the vehicle weight; or otherwise determined. For example, the tire pressure can be increased to take advantage of reduced rolling resistance on recently paved, smooth roads where the risk of a tire rupture due to road roughness is low. These variants enable this benefit by: dynamically inflating the tire during vehicle operation, and by minimizing the volume or concentration of water entrained in the inflation fluid (pressurized working fluid 32), thereby increasing tire reliability and lifespan.

Fifth, variants of the system can be distributed at each wheel of the vehicle (or a subset of wheels of the vehicle), which can reduce the vehicle-level complexity of an auto-inflation system 100 compared to a centralized inflation system 100, and can enable the control of tire pressure on a per-wheel basis without the need for complex and expensive plumbing, valve networks, and/or pressurized fluid manifolds.

Sixth, variants of the system can be physically rugged, robust, and/or otherwise resilient to the harsh environment in the vicinity of the wheel due to exposure to road debris and other hazards.

However, the system and/or method can confer any other suitable benefits and/or advantages.

3. System.

As shown in FIG. 1, the inflation system 100 includes a pump 200 and a dehumidifier 300 fluidly connected between the pump 200 and a reservoir 10, such as a tire 11. The inflation system 100 can optionally include a regeneration system 400, a housing 800, a cooling system 500, a reservoir connector 600, a control system 700, one or more manifolds fluidly connecting inflation system components, one or more valves controlling fluid flow between system components and/or the ambient environment, or any other suitable set of components.

The reservoir 10 is preferably a lumen or interior of a tire 11, but can alternatively or additionally be an intermediate reservoir 10 (e.g., defined by the inflation system housing 800), a pressure tank, or be any other suitable reservoir.

The working fluid source (fluid source) functions to provide working fluid 30 to the inflation system 100. The working fluid source is preferably the ambient environment, but can alternatively or additionally include a gas canister, a preliminary pump 200' (e.g., part of the inflation system 100, mounted to the inflation system housing 800, be a central tire inflation system 100, etc.), the tire interior, or any other suitable working fluid source. The working fluid 30 is preferably air, but can alternatively be nitrogen or any other suitable gas and/or liquid.

The inflation system 100 is preferably configured to statically couple to a rotatable surface 20 (examples shown in FIG. 3 and FIG. 4), but can alternatively be configured to mount to a static surface, a vertical surface, a cart, or to any other suitable support structure. The inflation system 100 can be mountable to the rotatable surface 20 (e.g., include bolt holes, hooks, or other mounting mechanisms), be mounted to the rotatable surface 20 (e.g., removably, permanently, etc.), integrated into the rotatable surface 20 (e.g., be a wheel component), or otherwise coupled to the rotatable surface 20.

The rotatable surface 20 is preferably the wheel 21 of a vehicle, but can alternatively be any suitable rotatable surface 20. The wheel preferably supports a tire (e.g., wherein the tire is mounted to the wheel), wherein the inflation system 100 can be fluidly connected to the tire and inflate the tire. The wheel can optionally include: a hub, spokes, a rim, brakes, and/or any other suitable component. The wheel is preferably rotatably attached to the vehicle by an axle, wherein each axle can include two, four, or any suitable number of wheels. In one example, an axle can include two wheels on each end. The vehicle can include two or more axles (e.g., driven or undriven).

Each vehicle can include one or more inflation systems. For example, when installed, each vehicle can include: one inflation system 100 per wheel, one inflation system 100 per axle end (e.g., include two tire connectors connecting the inflation system 100 to the first and second tire, respectively), inflation systems on the driven axles, inflation systems on the undriven axles, or any suitable number of inflation systems arranged in any suitable configuration.

Figure 3:
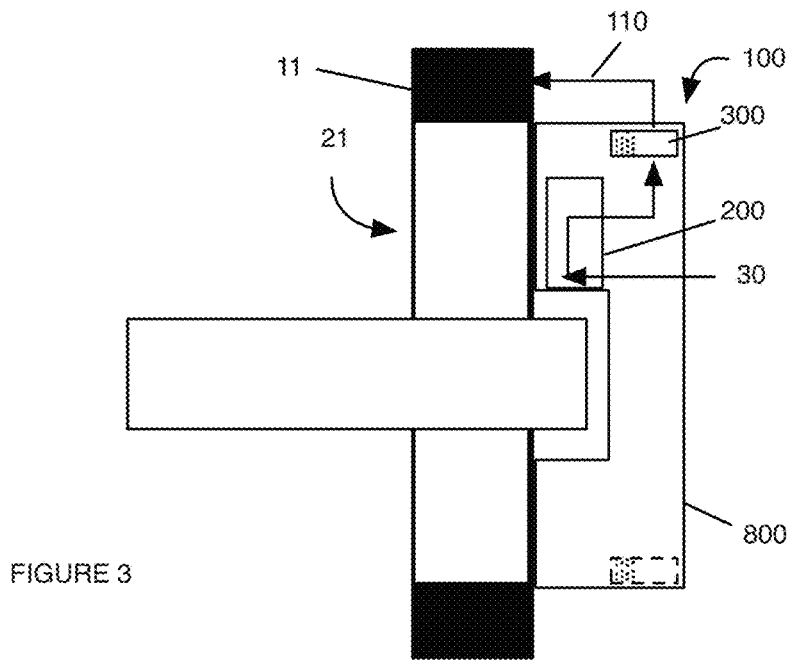
FIG. 3 is a cross-sectional schematic representation of an example of the inflation system, mounted to a wheel.

As shown in FIG. 3, the inflation system 100 is preferably coupled to the wheel end (e.g., broad face of the wheel, distal the vehicle center) of the respective wheel, but can alternatively be coupled to the axle end, the hub, spokes, rim (e.g., interior arcuate surface, exterior arcuate surface, etc.), or to any other suitable wheel or vehicle component.

The inflation system 100 preferably provides dehumidified, pressurized working fluid 34 to the reservoir 10. The dehumidified, pressurized working fluid 34 preferably has a humidity or water content lower than a predetermined threshold, but can alternatively or additionally have any other suitable humidity. The predetermined threshold can be: static, determined based on the tire make and/or model, determined based on the tire operation conditions (e.g., tire age, etc.), or otherwise determined. The predetermined threshold can be: absolute humidity (e.g., water vapor pressure), relative humidity, percent of water in the working fluid by mass, or otherwise defined. The predetermined threshold can be: 0.01% water (by mass), less than 0.1% water (by mass), less than 1% water (by mass), less than 3% water (by mass), less than 10% water (by mass), or be any other suitable threshold.

The pressurized working fluid 32 supplied to the reservoir 10 preferably has a pressure substantially equal to (e.g., within 5%, 10%, etc.) the target reservoir pressure (e.g., target tire pressure), but can alternatively have a higher pressure, lower pressure, or any other suitable pressure. The pressurized working fluid 32 can have the target reservoir pressure throughout the fluid circuit, or have varying pressures at different stages of the fluid circuit.

The inflation system components are preferably substantially equally distributed (e.g., by mass) across the inflation system 100, but can alternatively be unevenly distributed. Heavy components (e.g., battery, motor, pump 200, etc.) are preferably arranged radially inward, while lighter components (e.g., desiccant 320, manifolds, etc.) can be arranged radially outward, but the components can be otherwise arranged. Components with similar mass are preferably arranged opposing each other across the diameter of the inflation system 100, but can alternatively be otherwise arranged.

Heat-generating components of the inflation system 100 are preferably collocated or grouped together on the wheel, but can alternatively be dispersed. The heat-generating components are preferably arranged proximal other heat sources, such as the brakes or bearings, but can alternatively be arranged distal the heat sources (e.g., along a radially outward portion of the wheel, axially outward portion of the inflation system 100, etc.), or otherwise arranged.

The inflation system 100 is preferably operable between at least a pumping mode and a standby mode, and can optionally be operable in a purge mode (e.g., wherein liquid within the dehumidifier 300 or collection region 124 is purged from the system), a deflation mode (e.g., wherein the inflation system 100 deflates the reservoir 10), or in any other suitable set of modes. In one variation, the pumping mode, standby mode, and purge modes are discrete modes. In a second variation, the pumping, standby, and/or deflation modes can encompass the purge mode (e.g., wherein the system is concurrently pumped and purged, or purged during standby). However, the inflation system 100 can be operable between any suitable set of modes.

The pump 200 of the inflation system 100 functions to pressurize the working fluid from a first pressure to a second pressure, wherein the pressurized working fluid 32 is supplied to a tire. The pump 200 can optionally generate pressurized working fluid 32 to purge the dehumidifier 300. The pump 200 can optionally function as a preliminary dehumidifier 300', and remove a portion of the liquid fraction from the working fluid during working fluid pressurization and/or compression. The first pressure can be: ambient pressure, canister pressure, preliminary pump 200' pressure (e.g., between a fluid source pressure and the target reservoir pressure), or be any other suitable pressure. The second pressure can be: the target reservoir pressure, lower than the target reservoir pressure, higher than the target reservoir pressure, or be any other suitable pressure.

The pump 200 is preferably mounted to the rotatable surface 20 (e.g., wheel), such that the pump 200 rotates with the rotatable surface 20, but can alternatively be mounted to a structure proximal the rotatable surface 20 (e.g., axle), be mounted distal the rotatable surface 20 (e.g., to the body of the vehicle), or be otherwise located. The pump 200 is preferably mounted to the housing 800 of the inflation system 100, which is, in turn, mounted to the rotatable surface 20, but can alternatively be directly mounted to or integrated with the rotatable surface 20.

The pump 200 can include: one or more pump inlets, one or more pump outlets, a pump body, a drive mechanism, and/or any other suitable component. The system can include one or more pumps connected in series or in parallel. The pump 200 can be: a reciprocating pump 200, a rotary pump 200, a diaphragm pump 200, a peristaltic pump 200, or be any other suitable pump.

The pump inlet can be fluidly connected (e.g., directly or indirectly) to the fluid source, a preliminary dehumidifier 300' (e.g., an upstream filter, membrane, coalescing system, etc.), or any other suitable component. The fluid source can include: one or more preliminary pumps 200' (e.g., to form a multi-stage pressurization system), the ambient environment, the reservoir 10 (e.g., the tire interior), a gas canister, or any other suitable fluid source. The pump inlet can optionally include a valve (e.g., check valve, poppet valve, solenoid, etc.) that selectively controls fluid flow therethrough.

The pump outlet can be fluidly connected (e.g., directly or indirectly) to the reservoir 10 (e.g., the tire), the reservoir connector 600 (e.g., tire connector), a dehumidifier 300 (e.g., a preliminary dehumidifier 300', the main dehumidifier 300, etc.), or to any other suitable component. In variants, the pump outlet is connected to the reservoir 10 by an inflation manifold defining an inflation flow path 110. When the inflation system 100 is configured to couple to multiple tires, the inflation manifold can split into multiple sub-manifolds (e.g., N sub-manifolds to engage N tires), connected in parallel to the main inflation manifold, downstream from the pump 200 and/or dehumidifier 300.

The pump outlet can optionally include a valve (e.g., check valve, poppet valve, solenoid, etc.) that selectively controls fluid flow therethrough. The pump outlet is preferably separate and distinct from the pump inlet, but can alternatively be the same orifice.

The pump body (pump chamber) of the pump 200 functions to pressurize the working fluid ingressed through the pump inlet and egressed through the pump outlet. The pump body can includes a pump chamber (e.g., statically mounted to the wheel) and an actuation element (e.g., a piston) that actuates relative to the pump chamber along an actuation axis (e.g., piston actuation axis). The pump 200 is preferably arranged such that the actuation axis is substantially aligned with a radius of the inflation system 100, but can alternatively be arranged with the actuation axis perpendicular the inflation system radius, or be otherwise arranged. The pump 200 is preferably arranged with the actuation element arranged radially inward of the pump chamber, but can alternatively be otherwise arranged.

The inflation system 100 can optionally include a collection region 124 and/or condensation drain or valve that functions to collect the liquid 126 extracted from the working fluid during compression or pressurization. The collection region 124 (and/or condensation drain or valve) is preferably arranged along a radially-outward portion of the pump chamber, but can alternatively be arranged along a downward portion of the pump chamber (e.g., along a gravity vector), be arranged along a portion of the housing 800, or be arranged in any other suitable portion of the inflation system 100. The collection region 124 can include an outcropping (e.g., ogive- or wedge-shaped; arranged with an apex opposing the intended rotation direction; etc.; example shown in FIG. 5), a corner, or be otherwise configured. The condensation valve can be a centripetal valve (e.g., a valve that opens when a force, applied by water mass being forced radially outward by inflation system rotation, exceeds a cracking force of the valve; wherein the actuation axis of the valve disc can be substantially aligned along a radius of the inflation system 100; etc.), a solenoid, a check valve, or be any other suitable valve.

Figure 5:
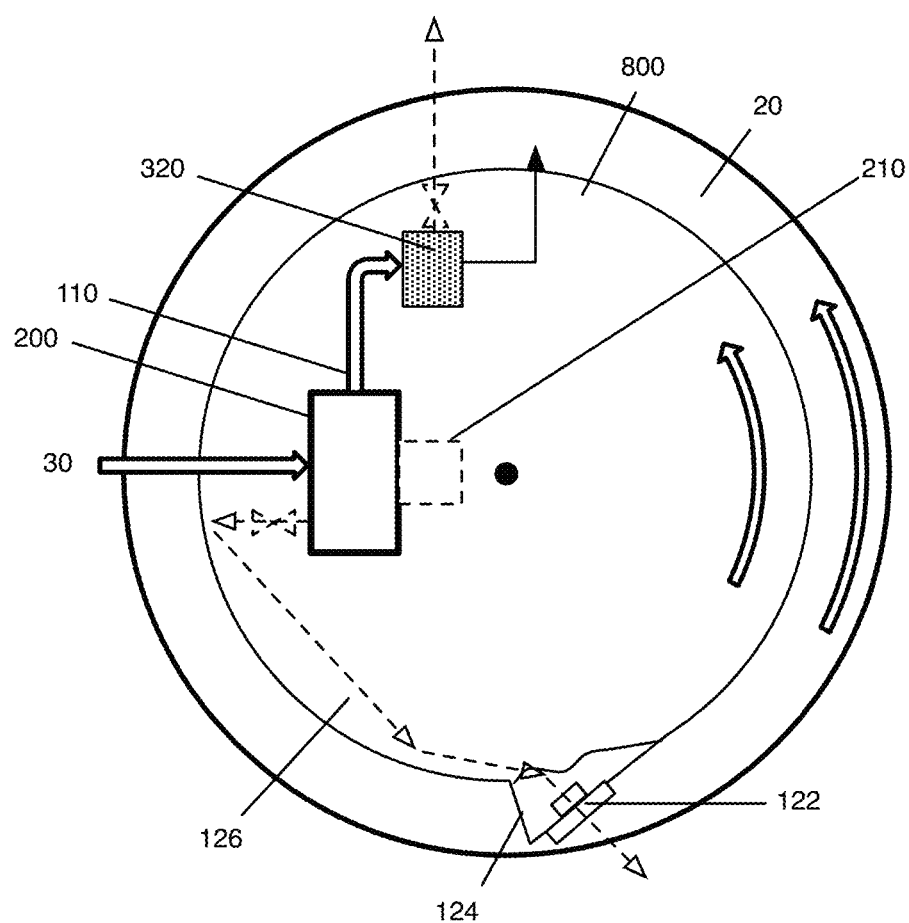
FIG. 5 is a schematic representation of a variant of the inflation system with a collection region.

The drive mechanism 210 of the pump 200 functions to drive pump 200 actuation (example shown in FIG. 5). The drive mechanism can be: an electric motor, an eccentric hanging mass that is rotatably mounted to the wheel and connected to a cam (such as those disclosed in U.S. application Ser. No. 13/188,400 filed 21 Jul. 2011, or U.S. application Ser. No. 13/797,826 filed 12 Mar. 2013, each of which are incorporated in their entireties by this reference, etc.), a flywheel, or be any other suitable drive mechanism.

The pump 200 can be actively controlled, passively controlled (e.g., by relative motion between inflation system components, backpressure from the tire, angular velocity, centripetal force, etc.), or otherwise controlled. When the pump 200 is actively controlled, the inflation system 100 can include a control system 700 that selectively controls the pump rate and/or pump operation based on: the target tire pressure (e.g., stored tire pressure), the angular velocity of the inflation system 100, or any other suitable parameter.

Figure 2:
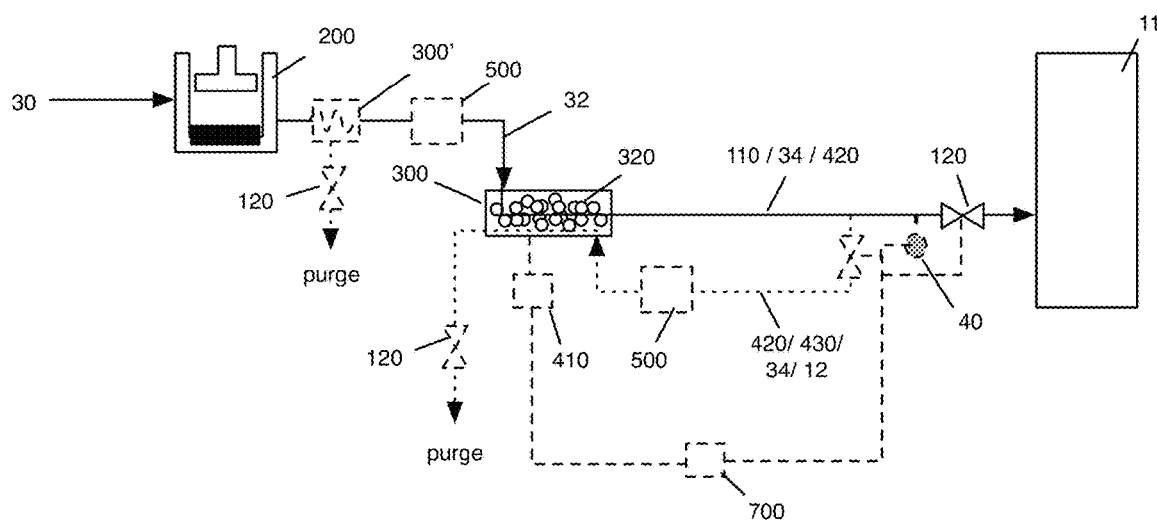
FIG. 2 is a schematic representation of a flow diagram variation of a wheel-mounted tire inflation system.

As shown in FIG. 1 and FIG. 2, the dehumidifier 300 of the inflation system 100 functions to reduce the vapor fraction in the pressurized working fluid 32, prior to supplying pressurized working fluid 32 to the reservoir 10 (e.g., the tire). The dehumidifier 300 can also function to vent water from the inflation system 100 into a second reservoir 10 (e.g., a storage tank, the ambient environment, etc.).

Figure 7:
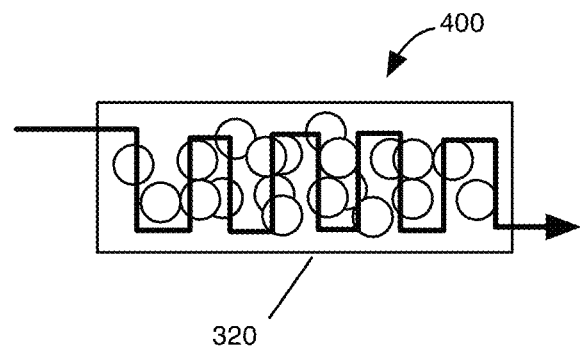
FIG. 7 is a schematic representation of a variant of the dehydrator defining a tortuous flow path through the desiccant.

The dehumidifier 300 can: filter, coalesce, aggregate, adsorb, absorb, entrain, or otherwise remove the vapor fraction from the working fluid (pressurized or unpressurized). In operation, the pressurized working fluid 32 is preferably flowed through the body of the dehumidifier 300 (e.g., through the thickness, height, width, a broad face, etc. of the dehumidifier 300; through drying channels, such as tortuous channels or linear channels defined through the dehumidifier volume, example shown in FIG. 7 and FIG. 8; through pores in the dehumidifier 300; etc.), across the top of the dehumidifier 300 (e.g., to remove humidified air entraining water desorbed from heated desiccant 320), or through any suitable portion of the dehumidifier.

Examples of dehumidifier 300 that can be used include: desiccant 320, a water-selective membrane (e.g., Gore™ membrane, Nafion™ membrane, proton exchange membranes (PEM), etc.), a coalescing filter, a coalescing manifold with nucleation points (e.g., straight, boustrophedonic, spiral channel, etc.), throttling channels or valves 120, condensers (e.g., the pump 200, a second pump, a compressor, a refrigerating system, etc.), or any other suitable dehumidifier.

The desiccant 320 can be: a kinetic bed; a fixed bed; a plurality of desiccant 320 beads (e.g., loosely packed, close packed, etc.); a liquid bed that the working fluid is bubbled through; or otherwise constructed. The desiccant 320 can be arranged along an arcuate segment of the housing 800 (e.g., trace all or a portion of the housing perimeter, example shown in FIG. 6; be arranged along a wedge of the housing; etc.), arranged within a localized dehydrator housing mounted to the housing 800 (e.g., be arranged along a radius of the housing 800), or be otherwise arranged. The desiccant 320 can be arranged in a desiccant housing with an inlet and an outlet (e.g., for pressurized working fluid 32 ingress or egress, respectively), or be otherwise contained. The desiccant 320 (e.g., hygroscopic substance) can include: activated alumina, aerogel, benzophenone, clay (e.g., bentonite clay), calcium chloride, calcium oxide, calcium sulfate (drierite), cobalt(II) chloride, copper(II) sulfate, lithium chloride, lithium bromide, magnesium sulfate, magnesium perchlorate, molecular sieve, phosphorus pentoxide, potassium carbonate, potassium hydroxide, silica gel, sodium, sodium chlorate, sodium chloride, sodium hydroxide, sodium sulfate, sucrose, sulfuric acid, a combination of the above (e.g., to maximize or optimize water adsorption at the ambient humidity for the operation environment), or any other suitable substance or material. The mass of desiccant 320 can be: predetermined (e.g., 3 grams, 5 grams, 10 grams, 20 grams, between 1 gram and 100 grams, or be any suitable amount), be determined based on the humidity of the ambient environment (or anticipated geographic location), be determined based on the mass of a counterbalancing inflation system component, or be otherwise determined.

The dehumidifier 300 is preferably mounted to the rotatable surface 20 (e.g., wheel), such that the dehumidifier 300 rotates with the rotatable surface 20, but can alternatively be mounted to the reservoir connector 600 (e.g., valve stem connector), mounted to a structure proximal the rotatable surface 20 (e.g., axle), be mounted distal the rotatable surface 20 (e.g., to the body of the vehicle), or be otherwise mounted. The dehumidifier 300 is preferably mounted to the housing of the inflation system 100, which is, in turn, mounted to the rotatable surface 20, but can alternatively be directly mounted to or integrated with the rotatable surface 20.

The inflation system 100 can include one or more dehumidifiers 300. When the inflation system 100 includes multiple dehumidifiers 300, the dehumidifiers 300 can be arranged in series, in parallel, or in any other suitable arrangement.

The dehumidifier 300 is preferably connected downstream from the pump 200, within the inflation fluid path or inflation manifold connecting the pump outlet and the reservoir 10 (e.g., between the pump 200 and the reservoir 10 or reservoir connector 600). However, the dehumidifier(s) 300 can additionally or alternatively be arranged: between a preliminary dehumidifier 300' and the reservoir 10 or reservoir connector 600; upstream from the pump 200 (e.g., at the pump inlet, at the working fluid source-inflation system interface), downstream from the pump 200, downstream from the reservoir 10, or otherwise arranged. The dehumidifier 300 preferably extends across the fluid path (e.g., such that the pressurized working fluid 32 flows through the dehumidifier 300 to the reservoir 10), but can alternatively extend parallel the fluid path (e.g., such that the pressurized working fluid 32 flows parallel the dehumidifier 300 and/or over the dehumidifier surface), at an angle to the fluid path, or in any other suitable orientation to the fluid path.

The inflation system 100 can optionally include one or more preliminary dehumidifiers 300' located upstream of the primary dehumidifier 300 (e.g., such that the inflation system 100 is a multi-stage dehumidification system). The preliminary dehumidifier 300' can be located: upstream of the pump 200 (e.g., at or before the pump inlet), between the pump 200 and the dehumidifier 300, or otherwise located. The preliminary dehumidifier(s) 300' can be one of the dehumidifier types discussed above, or be any other suitable dehumidifier. The system can optionally include one or more secondary dehumidifiers arranged downstream (e.g., in the inflation flow path 110) from the humidifier (e.g., primary humidifier).

The dehumidifier 300 is preferably arranged distal heat-generating components, such as the pump 200, the tire, the axle, the control system 700, the battery, or the brakes, but can alternatively be arranged proximal the heat-generating components (e.g., on the heat-generating components, adjacent the heat-generating components, etc.). For example, the dehumidifier 300 can be located: opposing the heat-generating component across the inflation system 100, in the coolest location of the inflation system 100, in a portion of the inflation system 100 exposed to airflow during vehicle movement, or in any other suitable position.

Additionally or alternatively, the dehumidifier 300 can be thermally insulated from the heat-generating components (e.g., with thermal insulation arranged between the dehumidifier 300 and the heat-generating component(s)), thermally connected to the heat-generating components, selectively thermally connected to the heat-generating components (e.g., by a mechanical actuation system; by the control system 700; a valve 120 that controls component-heated gas flow through or adjacent the dehumidifier 300, etc.), or otherwise related to the heat-generating components.

The inflation system 100 can optionally include a condensation drain that egresses the extracted vapor fraction (e.g., condensate) from the inflation system 100. The condensation drain is preferably fluidly connected to one or more of the dehumidifier 300, but can alternatively be fluidly connected to any other suitable component. The condensation drain is preferably profiled to preclude condensate backflow (e.g., include a backward-swept extension, opposing the forward-rotation direction; include a serpentine segment; etc.), but can be funnel-shaped, conical, or have any other suitable geometry. The condensation drain is preferably arranged along a radially outward portion of inflation system 100 (e.g., along the housing perimeter; be arranged radially outward of downstream fluid path, etc.), such that the condensate separated from the working fluid collects at the condensation drain (e.g., due to centripetal force generated by rotating system). However, the condensation drain can be otherwise arranged.

The inflation system 100 can optionally include a drain valve that functions to control fluid egress from the condensation drain. The drain valve is preferably fluidly connected to the condensation drain, more preferably to a radially-outward portion of the condensation drain, but alternatively any other suitable portion of the condensation drain. The drain valve can be active or passive. Examples of drain valves that can be used include: a centripetal valve 122, a solenoid, a check valve, the valve disclosed in U.S. Pat. No. 9,604,157, which is incorporated herein in its entirety by this reference, or any other suitable valve. Alternatively or additionally, the inflation system 100 can include a water selective membrane or other water egress control mechanism at the condensation drain outlet.

In one example, the inflation system 100 includes a dehumidifier 300 (e.g., including a desiccant 320) fluidly connected in series within the inflation manifold, between the pump 200 and the reservoir connector 600. In operation, pressurized working fluid 32 flows from the pump 200, through the dehumidifier 300, to the reservoir connector 600. In a second example, the inflation system 100 can be substantially similar to the first example, and additionally include a compressor upstream from the dehumidifier 300. In a first specific example, the upstream compressor is the pump 200, wherein pump compression or pressurization of the working fluid extracts a portion of the vapor fraction from the working fluid. In this specific example, the pump chamber can include a condensation drain and/or a drain valve to selectively purge the extracted water from the system. However, the compressor can be a separate compressor upstream from the pump 200 (e.g., be a preliminary pressurization pump 200, be a preliminary compressor), downstream from the pump 200, or be otherwise located. In a third example, the inflation system 100 includes a filter (e.g., particulate filter, water filter) upstream from the pump 200 (e.g., at the pump inlet, upstream from the pump inlet). In a fourth example, the inflation system 100 includes a condensation manifold downstream from the pump 200. The condensation manifold can be a part of the inflation manifold or be fluidly connected in series with the inflation manifold. The condensation manifold can include a series of curved channels (e.g., tortuous, etc.), wherein the curved channels can include one or more nucleation points (e.g., rough edges, etc.). The condensation manifold can optionally include a collection region 124 and a drain valve that purges the condensed liquid 126 (e.g., water) from the system. In a fifth example, the inflation system 100 includes a combination of one or more of the configurations mentioned above (e.g., forming a multi-stage water removal system).

As shown in FIG. 1 and FIG. 2, the inflation system 100 can optionally include one or more regeneration systems 400 that functions to regenerate one or more of the dehumidifier 300 (e.g., the desiccant 320). The regeneration system 400 preferably returns the dehumidifier 300 back to the initial adsorption capacity, rate, or efficacy, but can alternatively or additionally return the dehumidifier 300 back to a predetermined adsorption capacity, rate, or efficacy (e.g., 90%, 80%, 70%, etc. of the initial capacity), or achieve any other suitable metric. The regeneration system 400 can heat the dehumidifier 300, purge the dehumidifier 300, scrape the dehumidifier 300, or otherwise increase or recover the water-removal properties of the dehumidifier 300.

The regeneration system 400 is preferably mounted to the rotatable surface 20 (e.g., wheel), such that the regeneration system 400 rotates with the rotatable surface 20, but can alternatively be mounted to a structure proximal the rotatable surface 20 (e.g., axle), be mounted distal the rotatable surface 20 (e.g., to the body of the vehicle), be separate from the wheel or vehicle, or be otherwise located. The regeneration system 400 is preferably mounted to the housing of the inflation system 100, which is, in turn, mounted to the rotatable surface 20, but can alternatively be directly mounted to or integrated with the rotatable surface 20.

The regeneration system 400 can regenerate the dehumidifier 300: at a predetermined frequency, in response to occurrence of a regeneration event, when the tire is deflated, or at any other suitable time. The regeneration event can include: a dehumidifier 300 condition being met, a pressurized working fluid condition being met, a tire deflation event, or any other suitable event. Examples of dehumidifier 300 conditions that can trigger regeneration system operation include: dehumidifier mass change beyond a predetermined threshold, dehumidifier operation beyond a predetermined duration (e.g., determined based on the vapor content of the unpressurized working fluid 32, the desiccant operation parameters, etc.), dehumidifier volume exceeding a predetermined volume, or any other suitable dehumidifier condition. Examples of pressurized working fluid conditions that can trigger regeneration system operation include: the vapor content of the dehumidified, pressurized working fluid 34 egressing out of the dehumidifier 300 exceeding a predetermined threshold (e.g., humidity exceeding a predetermined threshold); or any other suitable pressurized working fluid condition.

In a first variation, the regeneration system 400 is on-board the inflation system 100. In this variation, the regeneration system 400 can regenerate the dehumidifier 300 during vehicle operation, during inflation system rotation with the wheel, while pumping or tire inflation, between tire inflation periods, during tire deflation, or regenerate the dehumidifier 300 during any other suitable system operation mode. In a second variation, the regeneration system 400 is separate from the inflation system 100, wherein the dehumidifier 300 is replaceable. However, the regeneration system 400 can be otherwise arranged relative to the dehumidifier 300.

The regeneration system 400 can include a heating element 410 that selectively heats the dehumidifier 300 (e.g., desiccant 320). The regeneration system 400 can include no heating elements, or one or more heating elements 410 per dehumidifier 300. The heating elements 410 can be shared across one or more dehumidifier 300 on the same inflation system 100 (e.g., in parallel, in series, etc.). The heating elements 410 can be actively or passively controlled. When the heating element 410 is actively controlled, the heating element 410 can be controlled by the control system 700 (e.g., based on the inflation system's 100 operation state, based on whether a regeneration event has occurred, based on the dehumidifier operation parameters, etc.) and powered by the on-board power source (e.g., battery, energy harvesting system, pump 200 drive mechanism, etc.). The type of heating element 410 paired with each dehumidifier 300 can be specific to the type of dehumidifier 300, or be otherwise selected.

The heating element 410 is preferably thermally connected to the dehumidifier 300, such as the interior or the housing of the dehumidifier 300, but can be fluidly connected to the dehumidifier 300 (e.g., fluidly connected to the desiccant 320 within the dehumidifier 300), or otherwise connected to the dehumidifier 300. The heating element 410 can be arranged: within the dehumidifier 300 (e.g., along an interior surface of the dehumidifier 300; throughout the volume of the dehumidifier 300, such as including resistive threads or wires throughout the desiccant 320 body), along the exterior of the dehumidifier 300 (e.g., along an exterior surface of the dehumidifier 300), arranged distal the dehumidifier 300, or otherwise arranged. The heating element 410 can be: a heater (e.g., resistive heater, carbon heating element 410, etc.), a thermal conduit (e.g., selectively connecting the desiccant 320 housing with waste gas from heat-generating components), a thermal manifold (e.g., selectively flowing gas, heated by waste heat from heat-generating components, through the desiccant 320), or any other suitable heating element.

The regeneration system 400 can include a purging system 420 that selectively purges adsorbed fluid from the dehumidifier 300 (e.g., from the desiccant 320).

The purging system 420 can be used independently of the heating element 410 (e.g., wherein the regeneration system 400 can include or exclude the heating element 410), or be cooperatively used with the heating element 410 during dehumidifier regeneration. The regeneration system 400 can include no purging systems or one or more purging systems purging systems per dehumidifier 300. Each purging system can be shared across one or more dehumidifier 300 on the same inflation system 100 (e.g., in parallel, in series, etc.).

Figure 8:
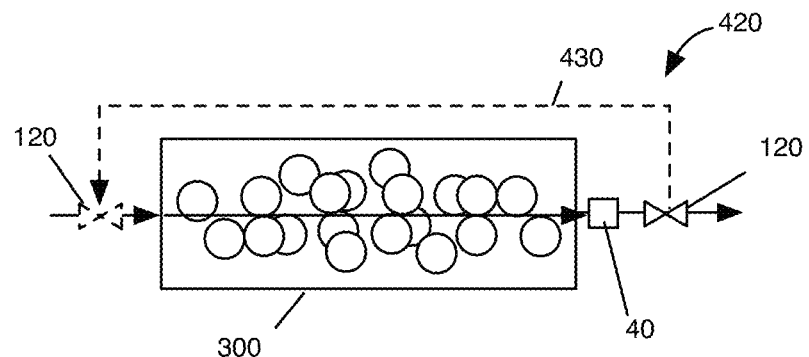
FIG. 8 is a schematic representation of a variant of the dehydrator with a regeneration manifold.

As shown in FIG. 2 and FIG. 8, the purging system 420 preferably purges the dehumidifier 300 using purging fluid from a purging fluid source, but can alternatively use any suitable fluid. In this variation, the purging system selectively fluidly connects the dehumidifier 300 with the purging fluid source.

The purging fluid is preferably has the same fluid composition as the pressurized and/or dehumidified and pressurized working fluid 32 (e.g., supplied to the tire), but can alternatively be a different fluid.

The purging fluid source can be: the ambient environment, the pump 200, the tire (example shown in FIG. 2), a secondary gas canister, the dehumidifier 300 (example shown in FIG. 8), a second dehumidifier 300, or be any suitable purging fluid source. When the purging fluid source is the tire, the regeneration system 400 can: only purge the dehumidifier 300 during tire deflation (e.g., when the control system 700 determines that the tire should be deflated); opportunistically purge the dehumidifier 300 with tire air 12 during tire deflation events, and purge the dehumidifier 300 with pump 200-supplied air at other times; purge the dehumidifier 300 using short bursts of tire air 12 (e.g., to prevent substantial tire deflation); or otherwise purge the dehumidifier 300 with tire air 12.

The purging fluid is preferably dry gas (e.g., having a humidity less than a predetermined humidity, such as less than 0.1% humidity, less than 1% humidity, less than 5% humidity, etc.; less than the equilibrium water vapor pressure of the wetted desiccant 320; having the tire humidity; etc.), but can alternatively have the ambient humidity, be drier than the ambient gas, or have any other suitable humidity.

The purging fluid is preferably supplied to the dehumidifier 300 via a purging manifold 430 (e.g., regeneration manifold) defining a regeneration flow path, wherein the purging manifold 430 is fluidly connected to the dehumidifier 300 at a first end, and fluidly connected to the purging fluid source at a second end. In a first variation, the purging manifold 430 can be the inflation manifold used to supply dehumidified, pressurized working fluid 34 to the tire. In this variation, the inflation manifold can optionally include a bidirectional valve (e.g., active valve, such as a solenoid; a passive valve operating based on pressure differentials between the dehumidifier-side and the tire-side of the valve; etc.) that permits fluid flow from the dehumidifier 300 to the tire in the inflation operation mode (e.g., opens toward the tire), permits fluid flow from the tire to the dehumidifier 300 in the regeneration mode, and is closed during the standby mode. In a second variation, the purging manifold 430 can be separate and/or distinct from the inflation manifold. In this variation, the manifold can be entirely open, wherein purging fluid flow can be controlled by a valve in the tire connector (e.g., selectively opened by the control system 700 during the regeneration mode or the deflation mode); include a valve (e.g., such as that mentioned above); or include any other suitable flow regulation mechanism.

At the dehumidifier endpoint, the purging fluid is preferably cooler than the dehumidifier temperature (e.g., the dehumidifier operation temperature, the heated dehumidifier 300, etc.), but can alternatively be: cooler than a predetermined temperature (e.g., less than 10 deg C., between 0 and 10 deg C., less than 20 deg C., etc.; which can be determined based on the material characteristics of the dehumidifier 300), cooler than or at the ambient temperature, at the tire temperature, less than a predetermined temperature difference from the ambient temperature, be hotter than the ambient temperature or tire temperature, or have any suitable temperature at the dehumidifier endpoint.

At the purging fluid source, the purging fluid can be hotter than the target purging fluid temperature (at the dehumidifier endpoint), wherein the purging fluid can be cooled en route to the dehumidifier 300. The purging system can include: a heat pump 200 (e.g., piezoelectric system), cooling fins in the purging manifold 430 (e.g., fluidly connected to the ambient environment or other heat sink), one or more expansion chambers (e.g., isobaric expansion, isoentropic expansion, etc.), or any other suitable cooling system.

The purging fluid (at the dehumidifier endpoint) can have a pressure: higher than the pressure adjacent the dehumidifier 300 (e.g., higher than the vapor pressure of the wetted desiccant 320), higher than the ambient pressure, substantially equivalent to the tire pressure, or have any suitable pressure.

The purging fluid can be flowed through the body of the dehumidifier 300 (e.g., through the thickness, height, width, etc. of the dehumidifier 300; through drying channels, such as tortuous channels or linear channels defined through the dehumidifier volume; through pores in the dehumidifier 300; etc.), across the top of the dehumidifier 300 (e.g., to remove humidified air entraining water desorbed from heated desiccant 320), or along any suitable portion of the dehumidifier 300. The purging flow path 430 through the dehumidifier 300 can be the same as the drying flow path (e.g., a segment of the inflation flow path no), be the drying flow path in reverse, be a separate flow path, or be otherwise configured. The purging fluid flow through the dehumidifier 300 is preferably turbulent, but can alternatively be laminar, bubbled through, or have any suitable flow characteristics through the dehumidifier 300.

The purging system 420 can optionally fluidly connect the dehumidifier 300 with a humid sink via a purge outlet fluidly connected to the purge manifold, wherein the humid sink can include: the ambient environment, the pump inlet, or any other suitable volume. The purge outlet can include a purge valve (e.g., active valve, passive valve, etc.), be open, or be otherwise configured. In one variation, the purge valve can be normally-closed, except during system operation in the regeneration mode.

The purging system 420 can be actively or passively controlled. When the purging system is actively controlled, the heating element 410 can be controlled by the control system 700 (e.g., based on the inflation system's 100 operation state, based on whether a regeneration event has occurred, based on the dehumidifier operation parameters, based on the tire pressure, etc.) and powered by the on-board power source (e.g., battery, energy harvesting system, pump 200 drive mechanism, etc.). When the purging system is passively controlled, the purging system can be controlled based on: the upstream manifold pressure from the purging fluid source (e.g., wherein a passive valve, connected to a regeneration manifold, opens when the upstream pressure from the fluid source exceeds the valve's cracking pressure); the weight of the dehumidifier 300 (e.g., wherein a dehumidifier 300 having at least a threshold mass is forced radially outward by centripetal force generated by the rotating system, and actuates a valve to permit purging fluid flow therethrough); or otherwise controlled.

However, the regeneration system 400 can include: a scraping mechanism, a blowoff system (e.g., a blowoff valve), a dehumidifier 300 replacement system (e.g., a tray), a drying agent, or any other suitable regeneration system.

In a first specific example, the regeneration system 400 includes a purging system (e.g., including a regeneration manifold and a purge valve) selectively fluidly connecting the tire (or tire connector) to the dehumidifier 300, wherein the regeneration system 400 purges the dehumidifier 300 with tire air 12. In this example, the regeneration manifold can be the same as the inflation manifold, or be a separate manifold (e.g., connected in parallel with the inflation manifold to the dehumidifier 300 and the tire connector). In this example, the regeneration manifold can be connected to the ambient environment downstream of the dehumidifier 300.

In a second specific example, the regeneration system 400 includes a purging system substantially similar to the first specific example, except that the regeneration manifold is fluidly connected between the pump 200 and the dehumidifier 300, and the regeneration system 400 purges the dehumidifier 300 with pressurized working fluid 32 from the pump 200. In this variation, the valve between the dehumidifier 300 and the tire (e.g., in the tire connector) can be selectively closed to prevent humid air from entering the tire.

In a third specific example, the regeneration system 400 includes a heating element 410 thermally connected to the dehumidifier 300, wherein the heating element 410 heats the dehumidifier 300 to desorb the entrained water.

In a fourth specific example, the inflation system 100 includes a combination of one or more of the configurations mentioned above.

As shown in FIG. 1, the inflation system 100 can optionally include a cooling system 500 that functions to cool the working fluid and/or the dehumidifier 300. The cooling system 500 is preferably thermally and fluidly connected to the working fluid and/or the dehumidifier 300, but can be otherwise connected to any suitable inflation system component. The inflation system 100 can include one or more cooling systems 500. A cooling system 500 can be arranged: between the pump 200 and the dehumidifier 300, in series within the regeneration manifold (e.g., between the tire and the dehumidifier 300), within the inflation manifold, off the regeneration manifold, or otherwise arranged. Examples of cooling systems 500 that can be used include: a thermal exchange system (e.g., cooling fins, etc. thermally connected to the ambient environment or other thermal sink), an expansion chamber (e.g., isobaric, isothermic, isoenthropic, etc.), a fan, a heat pump 200, or any other suitable cooling system.

In a specific example, the inflation system 100 includes a cooling system 500 (e.g., an expansion chamber) between the pump 200 and the dehumidifier 300. In a second specific example, the inflation system 100 includes a cooling system 500 (e.g., an expansion chamber) between the dehumidifier 300 and the reservoir connector 600 (e.g., tire connector). In a third specific example, the inflation system 100 includes a cooling system 500 (e.g., an expansion chamber) in the regeneration manifold, between the tire and the dehumidifier 300. In a fourth specific example, the inflation system 100 includes a combination of one or more of the configurations mentioned above.

As shown in FIG. 1, the inflation system 100 can optionally include a reservoir connector 600, which functions to interface the inflation system 100 with the reservoir 10 and to supply pressurized working fluid 32 to and/or from the reservoir 10. The reservoir connector 600 is preferably connected to the inflation manifold downstream from the dehumidifier 300, and is preferably configured to connect to an inlet or outlet of the reservoir 10. The reservoir connector 600 can optionally be fluidly connected to the regeneration manifold (e.g., be bifurcated and include a 2- or 3-way valve when the regeneration manifold is separate from the inflation manifold). The inflation system 100 can include one or more reservoir connectors 600, more preferably one for each reservoir 10 (e.g., each tire) on an axle end, but can alternatively include any suitable number of reservoir connectors 600. The reservoir connector 600 can be: an orifice (e.g., through the wheel rim, such as when the inflation system 100 is integrated into the wheel), a Schrader valve fitting (e.g., configured to threadably engage the tire valve stem), or be otherwise configured.

As shown in FIG. 1, the inflation system 100 can optionally include a control system 700 that functions to control dehumidifier regeneration, pump operation, tire inflation, tire deflation, and/or any other suitable component operation. The control system 700 preferably controls the inflation system 100 to meet target parameter values (e.g., target pressures, target working fluid humidity, target operation duration, target temperatures, etc.), but can alternatively or additionally be otherwise controlled. The target parameter values are preferably stored on-board the system, but can alternatively be calculated, selected, or otherwise determined. The control system 700 can include: a microprocessor, a CPU, a PGU, memory (e.g., flash, RAM), or any other suitable computing system. The control system 700 can be connected to: the active components of the inflation system 100 (e.g., pump 200, valves, heating elements 410, etc.), the on-board power source (e.g., battery), on-board sensors, or any other suitable endpoint.

The inflation system 100 can optionally include on-board sensors 40 that function to monitor one or more parameters of the inflation system components (example shown in FIG. 2). Examples of sensors that can be used include: kinetic sensors (e.g., IMUs, gyroscopes, accelerometers, etc.); humidity sensors (e.g., hygrometers); pressure sensors (e.g., TPMS); thermometers; odometers; height sensors; weight sensors; or any other suitable sensor. In a specific example, the dehumidifier 300 includes a hygrometer fluidly connected to the dehumidified working fluid egressed by the dehumidifier 300 (e.g., connected downstream from the dehumidifier 300; integrated into the reservoir connector 600, etc.). In a second specific example, the regeneration system 400 includes a temperature sensor connected to the heating element 410, the dehumidifier 300 (e.g., within the housing), and/or the purge outlet, wherein the temperature sensor can monitor the dehumidifier temperature. In a third specific example, the inflation system 100 can include a pressure sensor fluidly connected to the inflation manifold, and be configured to monitor the pressure of the pressurized working fluid 32. However, the inflation system 100 can include any other suitable set of sensors arranged in any suitable configuration.

Figure 4:
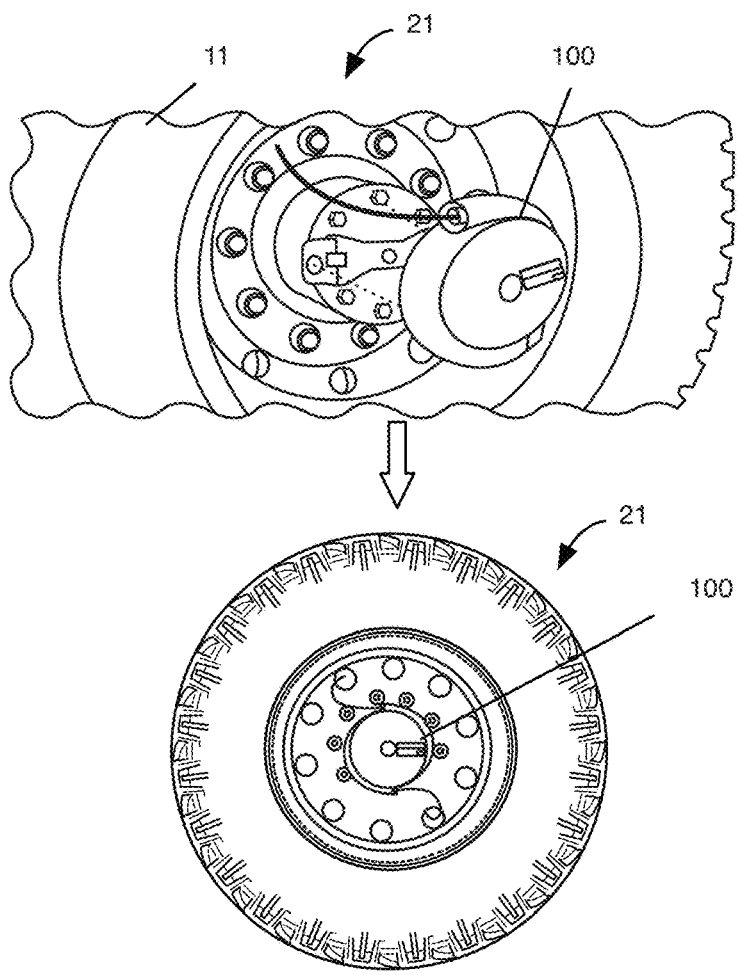
FIG. 4 is an example of an inflation system that removably statically mounts to a wheel.

As shown in FIG. 3 and FIG. 4, the inflation system 100 can additionally include a housing 800 that functions to statically mount, rotatably mount, encapsulate, and/or protect one or more of the inflation system components (e.g., pump 200, dehumidifier 300, etc.). The housing can additionally function to define the collection area 124 (e.g., of the separator). The housing 800 is preferably substantially rigid, but can alternatively be flexible. The housing 800 can be pressurizable (e.g., hold an interior pressure above atmospheric without failing), or be substantially un-pressurizable. The housing 800 can include a vent that vents the contents of the casing to the ambient environment when the interior pressure of the housing exceeds a threshold pressure. The housing 800 is preferably a disc, but can alternatively be prismatic or have any other suitable shape. In a first variation, the housing can be removably statically couplable to the wheel, and can include mounting mechanisms (e.g., via nuts, bolts, screws, adhesive, etc.). In this variation, the housing 800 is preferably configured to mount to the hub of the wheel, but can alternatively mount to the spokes, the rim, or to any suitable portion of the wheel. In a second variation, the housing can be the wheel itself. However, the housing 800 can be otherwise configured. The housing 800 preferably defines all fluid manifolds in the inflation system 100 (e.g., the inflation manifold, regeneration manifold, etc.), but the fluid manifolds can additionally or alternatively be tubes, hoses, or otherwise configured.

The inflation system 100 can optionally include valves, filters, separators (e.g., cyclone separators), manifolds, or any other suitable component. The inflation system 100 can include any number of the above, arranged in any position upstream of the reservoir 10. In one example, the inflation system 100 can include one or more purge valves fluidly connected to and/or configured to control fluid flow out of: the pump chamber, the coalescing system, the dehumidifier 300, between the dehumidifier 300 and the reservoir connector 600, or any other suitable component.

Figure 6:
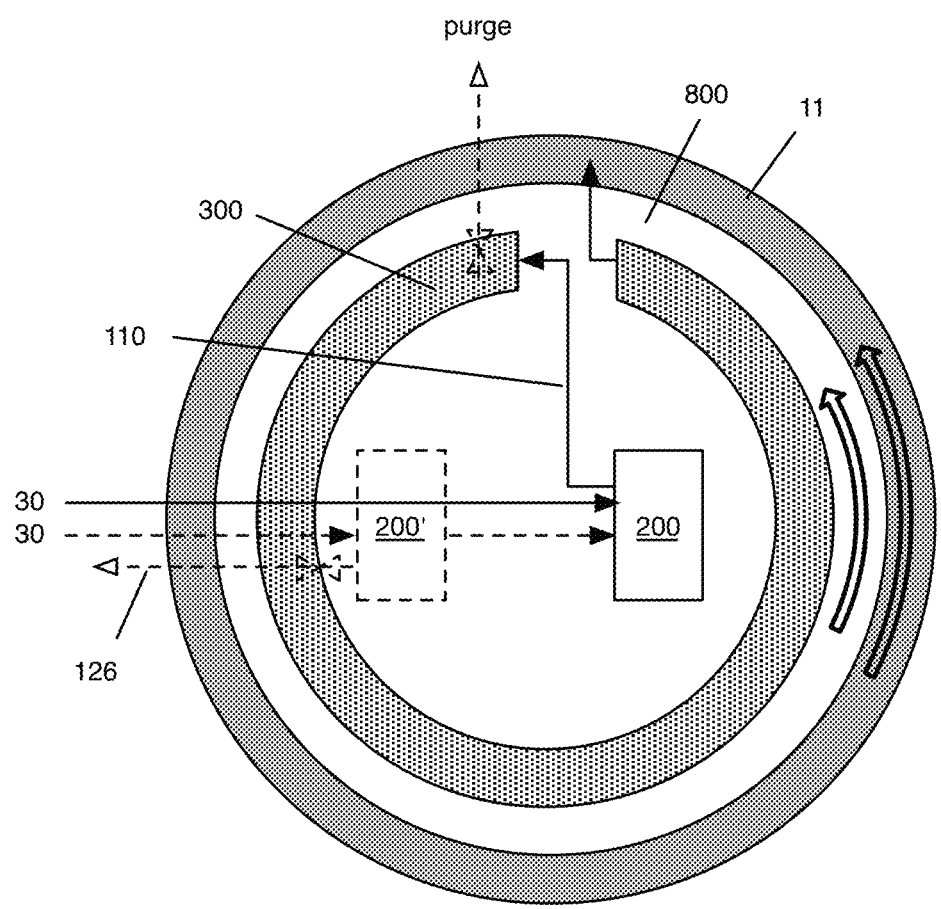
FIG. 6 is a schematic representation of a variant of the inflation system with a dehydrator tracing the housing perimeter.

In variations, the inflation system 100 can be configured to facilitate the transfer of dry air from the tire to the desiccant 320 in order to regenerate the desiccant 320. As shown by example in FIG. 6, such variations of the inflation system 100 can include a pump 200, a desiccant 320, and a flow path between the pump 200 and the desiccant 320 and between the desiccant 320 and the tire. In this example (as shown in FIG. 6), the inflation system 100 can further include a first purge valve between the pump 200 and the ambient environment, a second purge valve between the desiccant 320 and the ambient environment, and a control valve between the desiccant 320 and the tire volume. The system can be operable between at least a compression mode (e.g., inflation mode), a purging mode, and a regeneration mode. In one variation, in the compression mode, the control valve (e.g., in the tire connector) is operated in the open state (e.g., permitting compressed fluid flow from the pump 200, through the desiccant 320, into the tire), and the first and second purge valves are operated in the closed state (e.g., preventing fluid flow from the pump 200 or desiccant 320 to the ambient environment). In this variation, in the purging mode, the first purge valve (e.g., drain valve) is operated in the open state, and the second purge valve (e.g., the purging system's purge valve) and the control valve are operated in the closed state. In this variation, in the regeneration mode, the first purge valve is operated in the closed state, and the second purge valve and the control valve are operated in the open state such that dry compressed air from the tire is permitted to expand through the desiccant 320 and into the ambient environment (e.g., to regenerate the desiccant 320). However, the inflation system can be otherwise configured and operated.

4. Method.

Figure 9:
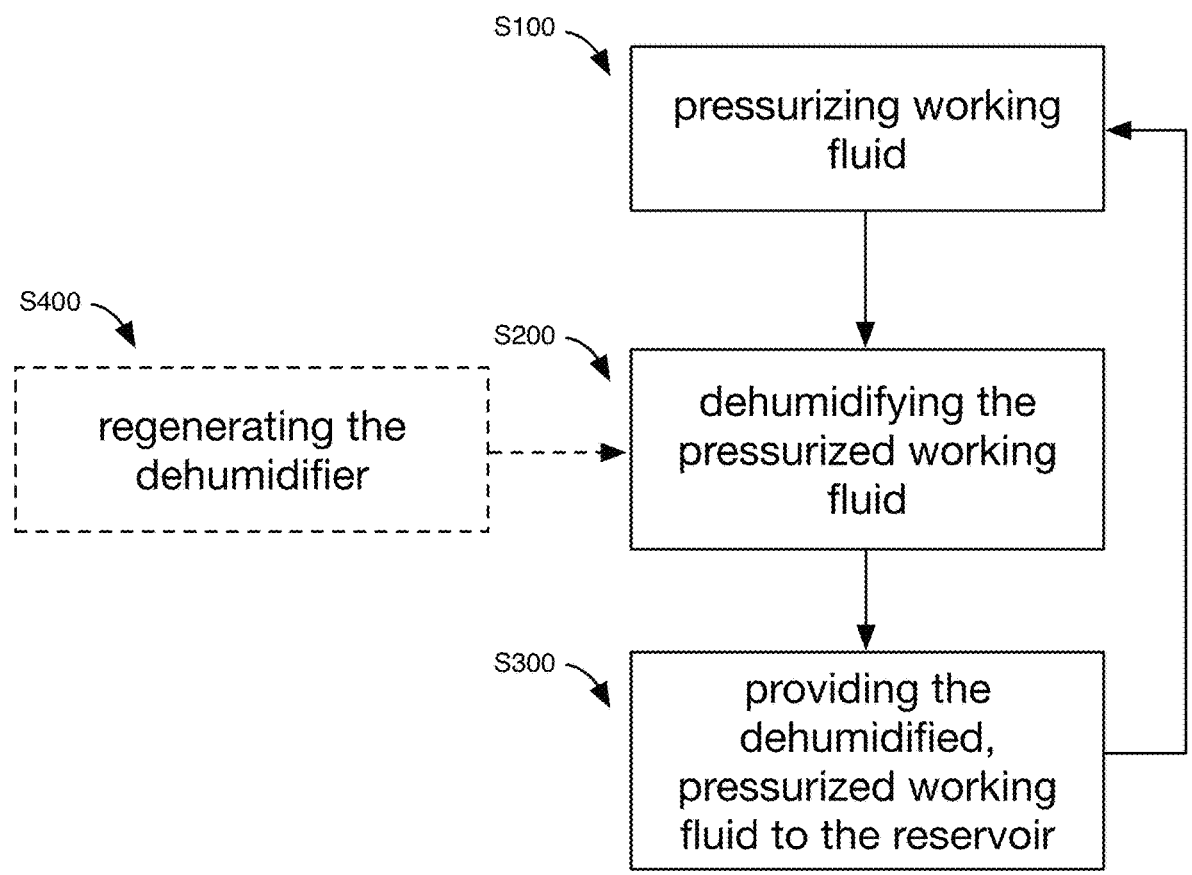
FIG. 9 is a flow diagram of the method.

As shown in FIG. 9, the method for wheel-end tire inflation includes: pressurizing a working fluid to generate pressurized working fluid S100; dehumidifying the pressurized working fluid to generate dehumidified working fluid S200; and providing the dehumidified working fluid to the tire mounted to the wheel S300. The method functions to inflate the tire with dehumidified, pressurized working fluid. The method is preferably performed using the system disclosed above, but can alternatively be performed using any other suitable system.

All or a portion of the method is preferably performed while the inflation system is mounted to and/or rotating with the wheel, but all or portions of the method can alternatively be performed while the wheel is stationary (e.g., when the vehicle is stopped, when the vehicle is parked, etc.) or at any other suitable time. In one example, the inflation system can inflate the tire (e.g., operate in the pumping or inflation mode) during wheel rotation, and purge the dehumidifier (e.g., operate in the purging mode) when the wheel is stationary. In a second example, the inflation system can both inflate the tire (e.g., operate in the pumping or inflation mode) and purge the tire (e.g., operate in the purging mode) during wheel rotation, preferably sequentially but alternatively concurrently. In a third example, the inflation system can deflate the tire (e.g., operate in the deflation mode) and purge the tire (e.g., operate in the purging mode) during wheel rotation, preferably concurrently but alternatively sequentially. However, portions of the method can be otherwise temporally related to wheel operation.

Figure 10:
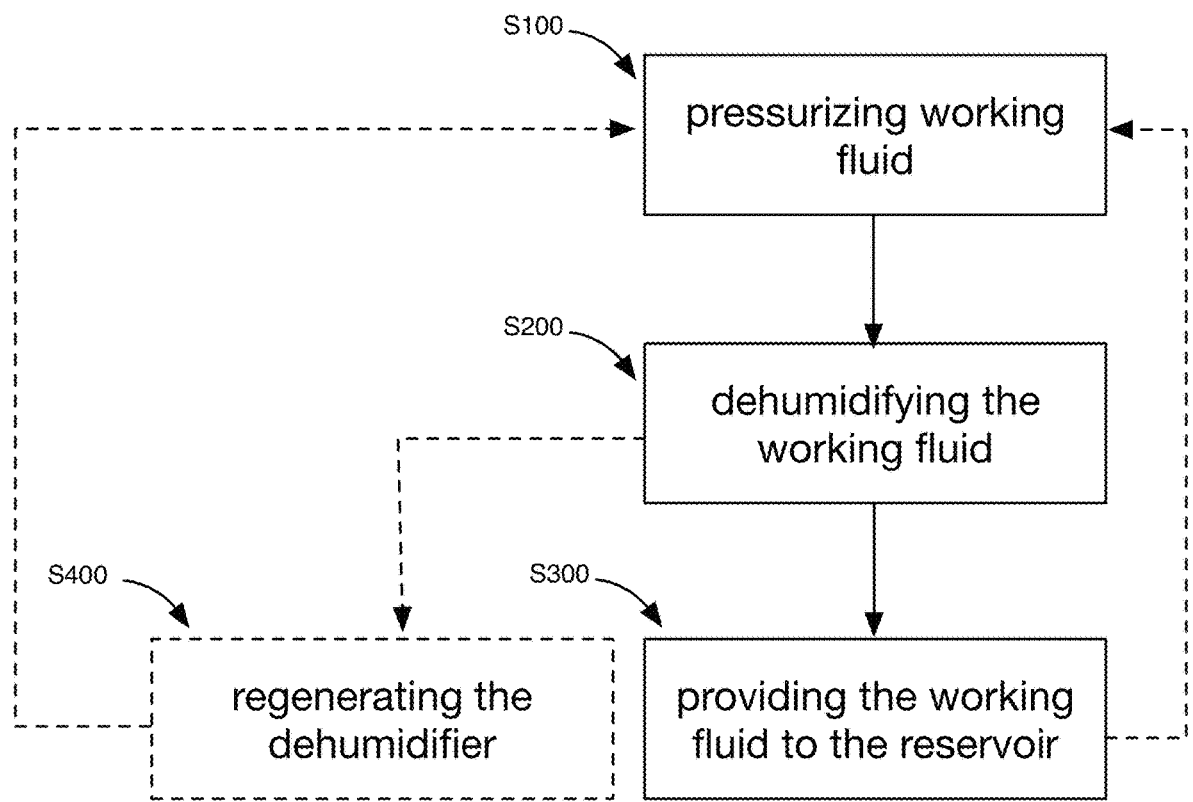
FIG. 10 is a flow diagram of a variation of the method.

The method is preferably performed continuously, but can alternatively be performed intermittently, consecutively, or in any other suitable order. Different processes of the method can be mutually exclusive (e.g., cannot be performed together; only performed in a given mode), or be concurrently performed or performable. In one example, the dehydrator can only be regenerated (e.g., the system can only operate in the regeneration mode) when the tire is not being inflated (e.g., when the system is not operating in the inflation mode; example shown in FIG. 11). In a second example, the dehydrator can only be regenerated (e.g., the system can only operate in the regeneration mode) when the tire is being deflated (e.g., when the system is operating in the deflation mode). In a third example, the dehydrator can be regenerated (e.g., the system can operate in the regeneration mode) while the tire is being inflated (e.g., when the system is operating in the inflation mode; example shown in FIG. 10). However, portions of the method can be otherwise temporally related to other method processes.

All or a portion of the method can be controlled by the control system, based on stored target parameter values, sensor measurements, vehicle operation parameters, tire operation parameters, or any other suitable piece of data.

Pressurizing a working fluid S100 functions to generate pressurized working fluid for tire inflation. The working fluid is preferably pressurized with one or more pumps (e.g., connected in series or in parallel), but can be otherwise pressurized. The working fluid is preferably ingressed from the ambient environment into the pump, but can alternatively be otherwise sourced. The working fluid is preferably pressurized to the target tire pressure, but can alternatively be underpressurized or overpressurized. S100 can be performed: continuously during wheel rotation; in response to occurrence of an inflation event (e.g., when the pressure sensor in the tire connector indicates that the tire has fallen below a target tire pressure; at a predetermined frequency; etc.); or at any suitable time.

Dehumidifying the pressurized working fluid S200 functions to generate dehumidified working fluid. The pressurized working fluid is preferably dehumidified with one or more dehumidifier (e.g., connected in series or in parallel), but can be otherwise dehumidified. The working fluid is preferably ingressed from the pump, but can alternatively be ingressed from a cooling system arranged between the pump and the dehumidifier, or be otherwise sourced. The working fluid is preferably dehumidified to the target tire air humidity, but can alternatively be more or less humid. S200 is preferably performed after S100 for a given fluid packet, but can alternatively or additionally be performed before or during S100. S200 can be performed: continuously during pump operation; continuously during system operation in the inflation mode; or at any suitable time. S200 preferably includes flowing the pressurized working fluid through the dehumidifier (e.g., through the desiccant bed in the dehumidifier), but can alternatively or additionally include: compressing the vapor fraction out of the working fluid, filtering the water out of the working fluid (e.g., with a coalescing filter or manifold), or otherwise removing some or all of the vapor fraction from the working fluid. In a first example, S200 includes flowing the pressurized working fluid through a dehumidifier en route to the tire connector. In a second example, S200 includes condensing the water fraction out of the working fluid concurrently with working fluid pressurization (e.g., with the pump), then flowing the partially-dehumidified, pressurized working fluid through the dehumidifier. This example can optionally include collecting the condensed liquid, purging the condensed liquid out of the system, or any other suitable process. Purging the condensed liquid can be performed using: the pressurized working fluid; centripetal force, generated by inflation system rotation with the wheel, to push liquid radially outward, toward condensation drain; or otherwise accomplished. In a third example, S200 includes coalescing water from the pressurized working fluid (e.g., from the pump) with a coalescing manifold or filter before flowing the partially dehumidified, pressurized working fluid through the dehumidifier. This example can optionally include collecting the condensed liquid, purging the condensed liquid out of the system, or any other suitable process. In a fourth example, S200 includes filtering water out of the working fluid before pump pressurization. In a fifth example, S200 includes a combination of all or some of the above. However, S200 can be otherwise performed.

Providing the dehumidified, pressurized working fluid to the tire mounted to the wheel S300 functions to inflate the wheel with dehumidified, pressurized working fluid. The dehumidified, pressurized working fluid is preferably provided through the tire connector, but can be otherwise provided. The dehumidified, pressurized working fluid is preferably pressurized to the target tire pressure, but can alternatively be underpressurized or overpressurized. The dehumidified, pressurized working fluid is preferably dehumidified to the target tire humidity, but can alternatively be more or less humid. S300 is preferably performed after S200 for a given fluid packet, but can alternatively or additionally be performed before or during S200. S300 can be performed: continuously during pump operation; continuously during system operation in the inflation mode; or at any suitable time. S300 preferably includes temporarily actively or passively opening the tire valve (e.g., the Schrader valve) when the fluid packet reaches the tire connector, but can include any other suitable process.

The method can optionally include regenerating the dehumidifier S400, which functions to remove some or all of the adsorbed fluid from the dehumidifier. S400 is preferably performed with the regeneration system, but can alternatively be performed with any suitable component. S400 can be performed: during pumping, during pump rotation with the wheel, during tire inflation, during tire deflation, or at any temporal relationship to the other processes.

S400 can be performed upon occurrence of a regeneration event, or at any suitable time. The regeneration event can be determined based on system operation parameters satisfying a regeneration condition, or be otherwise determined. The regeneration event can include: a predetermined duration being met; the wheel rotation rate falling above or rising above an angular velocity threshold; when tire inflation is not needed (e.g., to hit the target tire pressure); when tire deflation is needed (e.g., to hit a target tire pressure); when a dehumidifier operation parameter set satisfies a regeneration condition, or any other suitable event. The regeneration conditions can include: an estimated humidity of the dehumidified, pressurized working fluid (output by the dehumidifier) exceeding a predetermined humidity threshold; the working fluid flow rate (through the dehumidifier and/or out of the dehumidifier) falling below a predetermined threshold; the working fluid mass exceeding a predetermined threshold; the dehumidifier mass or volume exceeding a predetermined threshold (e.g., determined based on the pressure exerted by the desiccant on the dehumidifier walls; based on the centripetal force generated by the dehumidifier during inflation system rotation with the wheel; etc.); or any other suitable condition.

S400 can cease upon occurrence of a stop event, or at any suitable time. The stop event can include: tire deflation (operation mode) cessation, the tire nearing a predetermined (minimum) tire pressure, a predetermined purge duration being met (e.g., predetermined, set based on the desiccant type and estimated saturation at the beginning of the S400 iteration), or any other suitable stop event.

Figure 12:
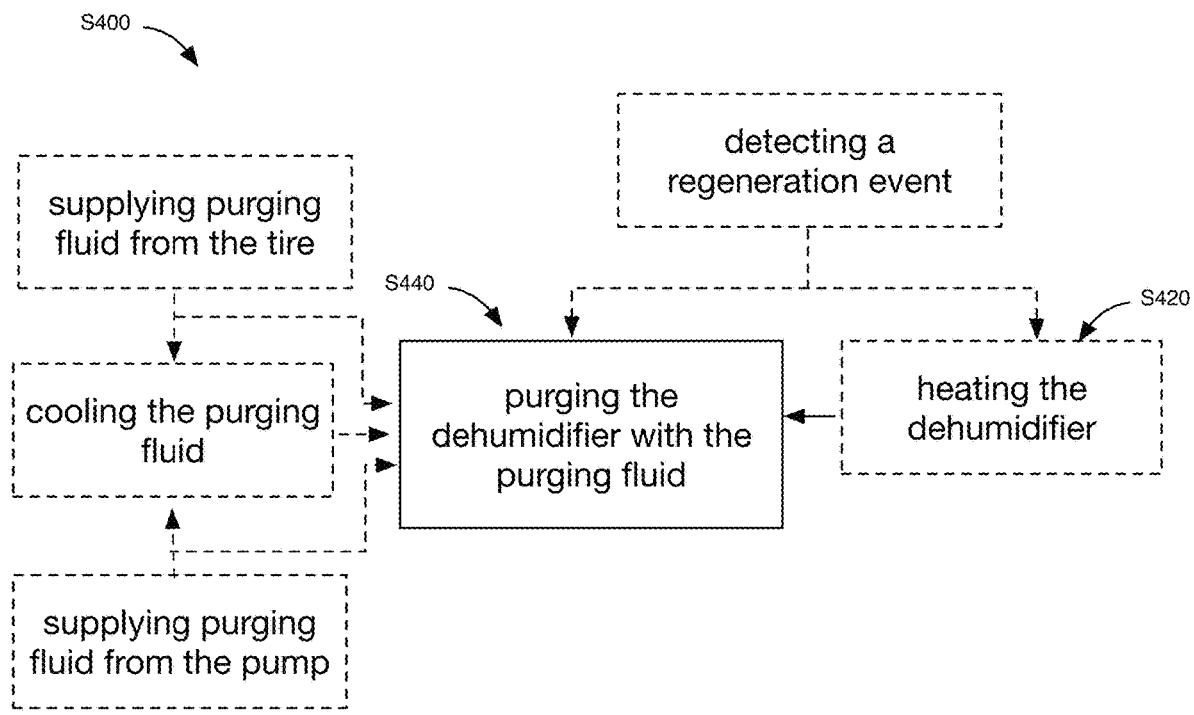
FIG. 12 is a schematic representation of purging the dehumidifier to regenerate the dehumidifier.

In one variation, S400 includes heating the dehumidifier with the heating element S420 (example shown in FIG. 12). The dehumidifier is preferably heated to a predetermined temperature (e.g., determined based on the degradation temperature of the dehumidifier and/or the adsorption temperature of the dehumidifier), but can additionally or alternatively be heated to any suitable temperature. The dehumidifier is preferably heated for a predetermined amount of time (e.g., for the duration of S400, for a predetermined period of time before purging, for 5 min, for 10 min, etc.), but can alternatively be heated for any suitable period of time.

In a second variation, S400 includes purging the dehumidifier with a purging fluid S440 (example shown in FIG. 12). In one embodiment, the dehumidifier is purged with tire air (e.g., purged with pressurized working fluid from the tire). In a second embodiment, the dehumidifier is purged with pressurized working fluid from the pump. However, the dehumidifier can be otherwise purged. S440 can be performed before, after, during, or independent of S420 performance. S440 can optionally include cooling the purging fluid (e.g., from the tire, the pump, etc.) prior to purging fluid introduction into the dehumidifier (example shown in FIG. 13). However, S440 can be otherwise performed.

Figure 13:
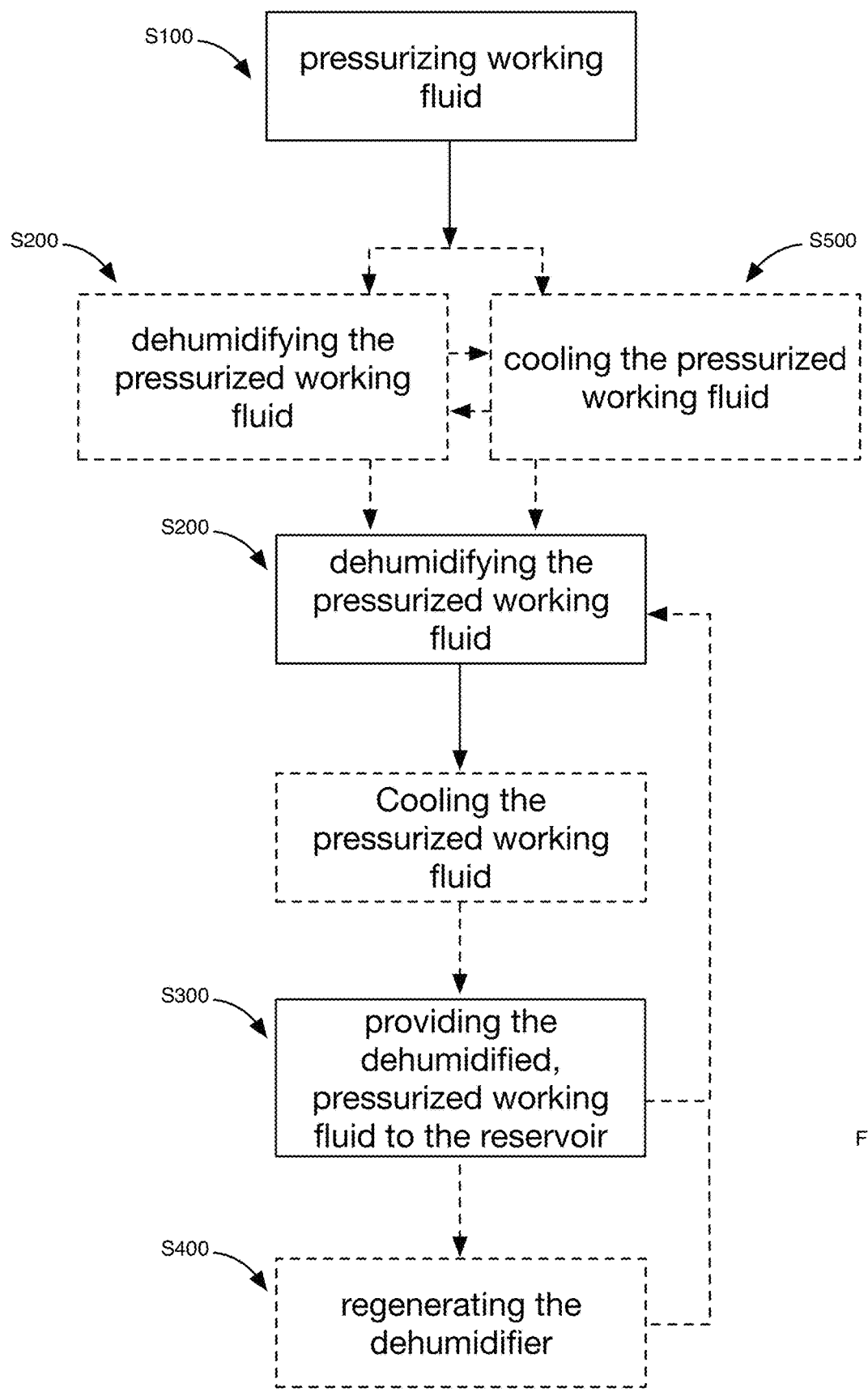
FIG. 13 is a schematic representation of an example of the method.

The method can optionally include cooling the pressurized working fluid S500, which functions to decrease the temperature of the pressurized working fluid (example shown in FIG. 13). S500 can be performed after, during, and/or before dehumidifying the pressurized working fluid. In variants, this can maximize performance of the desiccant, since desiccants can adsorb more water within a specified temperature range. The pressurized working fluid can be cooled to a temperature within the operational temperature range for the dehumidifier, or to any other suitable temperature. S500 is preferably performed with a cooling system arranged upstream from the dehumidifier (e.g., within the inflation manifold), but can be performed with any other suitable component.

The method can optionally include partially deflating the tire upon occurrence of a deflation event prior to pressurizing the working fluid. The deflation event can include: the current tire pressure exceeding a target tire pressure, or any other suitable deflation event. The method can optionally include periodically inflating and/or deflating a tire.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. An inflation system for a tire mounted to a wheel, the wheel mounted to a rotatable portion of a wheel hub assembly, the inflation system comprising:

a drive mechanism configured to mount to the rotatable portion of the wheel hub assembly;

a pump driven by the drive mechanism and configured to statically mount to the wheel and fluidly connect to the tire;

a liquid removal system fluidly connected to the pump, wherein the liquid removal system comprises a dehumidifier and is configured to selectively purge a liquid fraction of working fluid to the ambient environment, wherein the liquid removal system further comprises a heating element thermally connected to the dehumidifier and configured to selectively heat the dehumidifier prior to purging of the liquid fraction of working fluid;

a working fluid inlet fluidly arranged between the ambient environment and the pump; and a filter arranged between the working fluid inlet and the pump;

wherein the inflation system is configured to operate between a set of modes, comprising:

an inflation mode, wherein the heating element does not heat the dehumidifier and wherein the pump forces pressurized working fluid into the tire; and a regeneration mode, wherein the heating element heats the dehumidifier and wherein the pump does not force pressurized working fluid into the tire.

2. The inflation system of claim 1, wherein the drive mechanism comprises an eccentric mass configured to rotatably mount to the rotatable portion of the wheel hub assembly.

3. The inflation system of claim 1, further comprising a pressure sensor and a control system, wherein the pump is actively controlled by the control system based on measurements sampled by the pressure sensor.

4. The inflation system of claim 1, further comprising a housing configured to statically mount to the rotatable portion of the wheel hub assembly, wherein the drive mechanism, the pump, and the liquid removal system are positioned inside the housing.

5. The inflation system of claim 1, wherein the liquid removal system comprises a collection region arranged radially outward relative to the pump.

6. The inflation system of claim 5, wherein the collection region comprises an outcropping arranged with an apex opposing a forward rotation direction of the wheel.

7. The inflation system of claim 5, wherein the liquid removal system further comprises a drain valve fluidly connected to the collection region.

8. The inflation system of claim 1, wherein the liquid removal system comprises a valve.

9. The inflation system of claim 8, wherein the valve comprises a passive valve.

10. The inflation system of claim 8, wherein the valve comprises a solenoid valve.

11. The inflation system of claim 8, wherein the valve is arranged radially outward relative to an axis of wheel rotation.

12. The inflation system of claim 8, wherein the valve is powered by an on-board power source.

13. The inflation system of claim 12, wherein the pump is driven by relative rotation between the drive mechanism and the rotatable portion of the wheel hub assembly, wherein the on-board power source comprises an energy harvesting system configured to harvest energy from the relative rotation between the drive mechanism and the rotatable portion of the wheel hub assembly.

14. A method for a tire mounted to a wheel, the wheel mounted to a rotatable portion of a wheel hub assembly, the method comprising:

pressurizing a fluid using a pump driven by relative rotation between the rotatable portion of the wheel hub assembly and a hanging mass rotatably mounted to the rotatable portion, wherein the pump is statically mounted to the rotatable portion;

collecting water from the pressurized fluid using a desiccant while a heating element thermally connected to the desiccant is off;

providing the pressurized fluid to the tire; and heating the desiccant while the heating element is on;

monitoring a humidity of the pressurized fluid, wherein the collected water is purged using working fluid from the tire based on the humidity of the pressurized fluid.

15. The method of claim 14, wherein the collected water is purged using a solenoid valve.

16. The method of claim 14, further comprising determining a target tire pressure, wherein pressurizing the fluid with the pump comprises pressurizing the fluid to the target tire pressure.

17. The method of claim 14, wherein purging the collected water from the system comprises actuating a valve.

18. The method of claim 17, wherein the valve is automatically actuated.

19. The method of claim 17, wherein the valve is passively actuated.

20. The method of claim 14, wherein the water is collected in a collection region located radially outward from an axis of wheel rotation.

* * * * *